United States Patent
Abe et al.

(10) Patent No.: US 6,636,826 B1
(45) Date of Patent: Oct. 21, 2003

(54) ORIENTATION ANGLE DETECTOR

(75) Inventors: Hiroshi Abe, Sendai (JP); Kazutake Muto, Sendai (JP)

(73) Assignee: NEC Tokin Corporation, Tokyo (JP)

(*) Notice: Subject to any disclaimer, the term of this patent is extended or adjusted under 35 U.S.C. 154(b) by 0 days.

(21) Appl. No.: 09/858,000

(22) PCT Filed: Jul. 22, 1999

(86) PCT No.: PCT/JP99/03936
§ 371 (c)(1),
(2), (4) Date: Jun. 13, 2001

(87) PCT Pub. No.: WO00/36376
PCT Pub. Date: Jun. 22, 2000

(30) Foreign Application Priority Data

Dec. 17, 1998 (JP) .......................................... 10-375965
Dec. 17, 1998 (JP) .......................................... 10-375966
Dec. 17, 1998 (JP) .......................................... 10-375967

(51) Int. Cl.$^7$ ................................................ G01C 9/00
(52) U.S. Cl. .................................................... 702/151
(58) Field of Search ......................... 702/151; 33/302; 324/253; 74/5.6; 701/202; 345/427; 364/565, 483, 434; 381/25; 356/152; 128/782

(56) References Cited

U.S. PATENT DOCUMENTS

| 4,254,465 A | | 3/1981 | Land |
| 4,559,713 A | * | 12/1985 | Ott et al. ...................... 33/302 |
| 4,608,641 A | | 8/1986 | Snell |
| 5,373,857 A | | 12/1994 | Travers et al. |
| 5,526,022 A | * | 6/1996 | Donahue et al. ............. 324/253 |

FOREIGN PATENT DOCUMENTS

EP 0 292 339 11/1988

* cited by examiner

Primary Examiner—John Barlow
Assistant Examiner—Tung Lau
(74) Attorney, Agent, or Firm—Frishauf, Holtz, Goodman & Chick, P.C.

(57) ABSTRACT

An orientation angle detector using gyroscopes (301–303) for detecting X-, Y- and Z-angular velocities which are time-integrated (60) to produce pitch, roll and yaw angles ($\gamma$, $\beta$, $\alpha$) of the orientation. Two accelerometers (403, 404) are used to obtain tentative pitch and roll angles in order to correct the pitch and roll angles, and two terrestrial magnetometers (401, 402) are used to obtain a tentative yaw angle so as to correct the yaw angle. When the tentative pitch, roll and yaw angles are defined accurate (50), the integrated pitch, roll and yaw angles are corrected (60) by the tentative pitch, roll and yaw angles.

64 Claims, 15 Drawing Sheets

ORIENTATION ANGLE DETECTOR

This application is a U.S. National Phase Application under 35 USC 371 of International Application PCT/JP99/03936 (published in Enqlish) filed Jul. 22, 1999.

TECHNICAL FIELD

This invention relates to an orientation angle detector using gyroscopes and, in particular, to compensation or correction of orientation angle measured by the, gyroscopes in such an orientation angle detector.

BACKGROUND ART

In the prior art, an orientation angle detector is used for head tracking in virtual environment, augmented reality and teleoperator systems using head mounted displays (HMDs). It can also be used as an input device for computers.

A known three dimensional (3-D) orientation angle detector comprises three gyroscopes (which will be referred to as "rate gyros") disposed in three orthogonal axes on a moving body to obtain three orthogonal angular rates or velocities. The orthogonal angular rates are integrated to produce three angular factors representing the orientation angle. The, orientation angle, is usually represented by X-Y-Z Euler's angle. $\theta=(\alpha, \beta, \gamma)$. The known orientation angle detector is disclosed in a paper by Yamashita et al, entitled "Measurement of Human Head Motion using A Three-Dimensional Posture Angle Sensor", National Convention Record of I.E.E. Japan, Vol. 3 (1997), p.p. 304–305.

In order to compensate errors integrated in integration of the angular velocities measured by the rate gyros, it is also known, as is also disclosed in the paper mentioned above, to use three accelerometers which are also disposed in the same three orthogonal axes to measure acceleration in the three orthogonal directions. Another set of three angular factors representing the orientation angle is calculated from the measured acceleration, and is used for estimation and correction of the orientation angle measured by the rate gyros.

Fiber optics gyroscopes (FOGs) and semiconductor accelerometers are usually used for the rate gyros and the accelerometers. The FOG is excellent in its accuracy but is very expensive. A Coriolis vibratory gyroscope known as a piezoelectric vibratory gyroscope is economically useful because of its low cost but is low in its accuracy.

It is an object of this invention to provide an orientation angle detector which has excellent-accuracy and which is simple in structure, and which can use FOGs for the rate gryos but can also use Coriolis vibratory gryoscopes to lower the cost of the detector without significant degradation of accuracy in comparison with use of FOGs.

SUMMARY OF THE INVENTION

According to this invention, an orientation angle detector is provided which comprises a plurality of gyroscopes disposed in parallel with a plurality of orthogonal axes (Xs-Zs) defining a detector co-ordinate on the detector, respectively, for measuring angular velocities (Jx, Jy, Jz) around respective axes (Xs-Zs), a motion angle calculator coupled to the plurality of gryoscopes for calculating a motion angle ($\Delta X, \Delta Y, \Delta Z$) from the angular velocities (Jx, Jy, Jz), at least one accelerometer disposed in parallel with at least one of the orthogonal axes (Xs-Zs) for measuring acceleration (Ax, Ay), a static angle calculator coupled to the at least one accelerometer for calculating a static angle (R, P) from the acceleration (Ax, Ay) and an orientation angle calculator coupled to the motion angle calculator and the static angle calculator for integrating the motion angle ($\Delta X, \Delta Y, \Delta Z$) to an integrated angle and calculating an orientation angle ($\alpha, \beta, \gamma$) from the integrated angle and the static angle (R, P), wherein the orientation angle ($\alpha, \beta, \gamma$) is an angular difference between the detector co-ordinate (Xs-Ys-Zs) and a reference co-ordinate (X-Y-Z) in a space including the detector, wherein two magnetometers are disposed in parallel with two fo the plurality of orthogonal axes (Xs, Ys) to measure terrestrial magnetic components (MX, My) in the two of the plurality of axes (Xs, Ys) and wherein the static angle calculator is coupled to the two magnetometers for calculating an azimuth from the terrestrial magnetic components (Mx, My) to produce from the azimuth an azimuthal deviation angle $\Phi$ from the reference co-ordinate (X-Y-Z) as an additional factor of the static angle (R, P).

Further, according to this invention, orientation angle detectors as described in dependent claims.

BEST MODES FOR CARRYING OUT THE INVENTION

Figure 1:
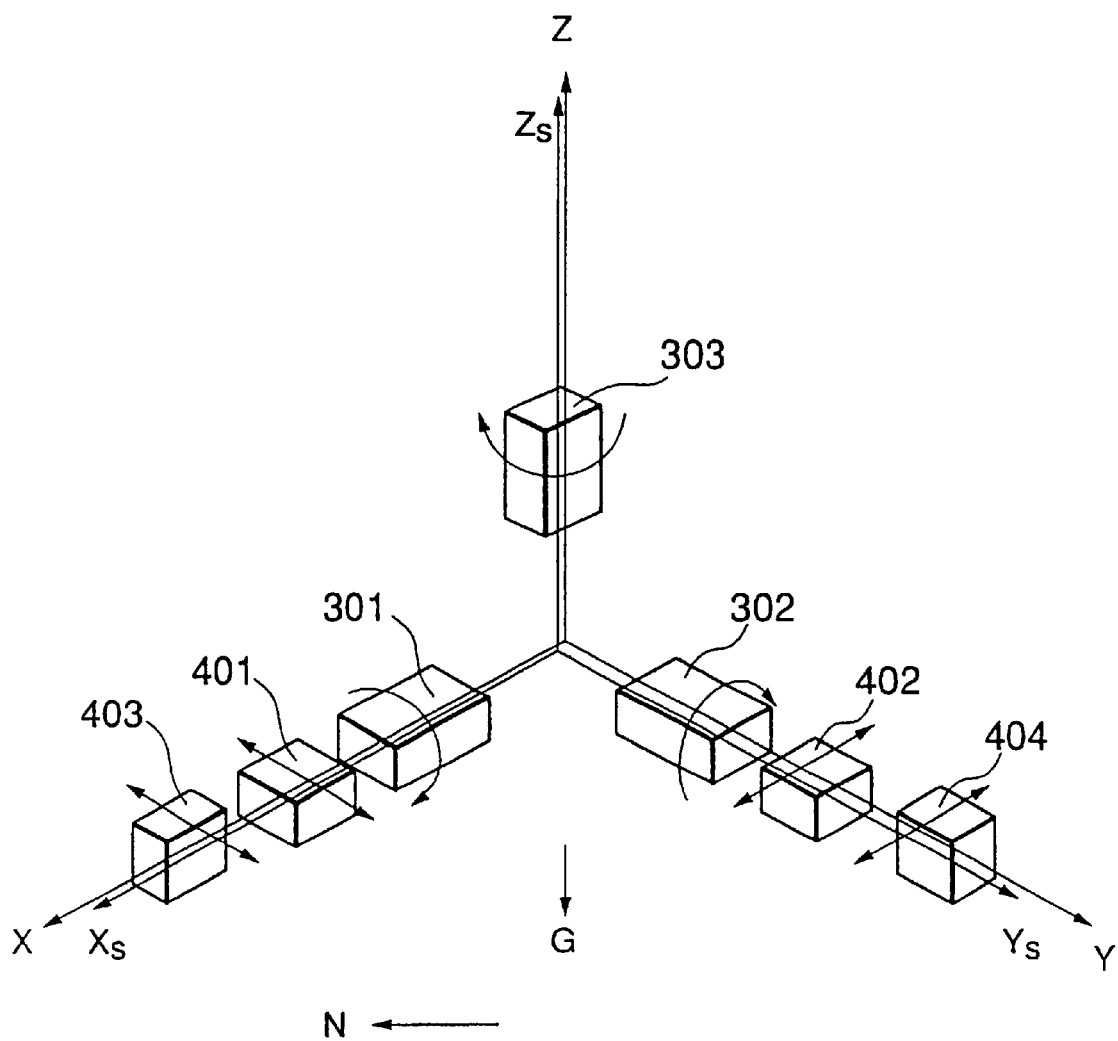
FIG. 1 is a schematic view illustrating of disposition of rate gyros, accelerometers, and terrestrial magnetometers in an orientation angle detector according to an embodiment of this invention.

Now, referring to FIGS. 1–3, description will be made as regards an orientation angle detector according to one embodiment of this invention shown therein. The orientation angle detector of this embodiment is directed to one for detecting an orientation of an object in a three dimensional (3-D) space.

The orientation angle detector shown in the figures comprises first through third gyroscopes 301–303 disposed in parallel with three orthogonal axes Xs, Ys and Zs defining a detector co-ordinate on the detector, respectively, for measuring first through third angular velocities Jx, Jy, and Jz around respective axes Xs, Ys, and Zs.

A motion angle calculator 310 is coupled to the first through third gyroscopes 301–303 for calculating a motion angle (ΔX, ΔY, ΔZ) from the first through third angular velocities Jx, Jy, and Jz. First and second accelerometers 403 and 404 are disposed in parallel with two the orthogonal axes Xs, and Ys for measuring first and second acceleration Ax and Ay. These accelerometers are for measuring the gravity acceleration.

A static angle calculator 405 coupled-to the first and second accelerometers 403 and 404 for calculating a static angle (R, P) from the acceleration Ax and Ay.

An orientation angle calculator 60 is coupled to the motion angle calculator 310 and the static angle calculator 405 for integrating the motion angle (ΔX, ΔY, ΔZ) to an integrated angle (ΣΔX, ΣΔY, ΣΔZ) and calculating an orientation angle α, β, γ from the integrated angle and the static angle (R, P). The orientation angle (α, β, γ) is an angular difference between the detector co-ordinate (Xs-Ys-Zs) and a reference co-ordinate (X-Y-Z) in a space including the detector.

Further, first and second magnetometers 401 and 402 are disposed in parallel with two of the plurality of orthogonal axes Xs and Ys to measure terrestrial magnetic components Mx and My. The static angle calculator 405 is coupled to the first and second magnetometers 401 and 402 for calculating an azimuth from the terrestrial magnetic components Mx and My to produce, from the azimuth, an azimuthal deviation angle Φ from the reference co-ordinate (X-Y-Z) as an additional factor of the static angle (R, P).

The orientation angle detector further comprises an orientation angle memory 70 coupled to the orientation angle calculator 60 for storing the orientation angle (α, β, γ). The orientation angle is represented by Z-Y-X Euler's angle which is composed of three components of yaw angle α being a rotational angle around Z axis, a pitch angle β being a rotational angle around Y axis, and a roll angle γ being a rotational angle around X axis.

The motion angle has three factors an X-moving angle ΔX around the X axis, a Y-moving angle ΔY around the Y axis, and a Z-moving angle ΔZ around Z axis.

While, the static angle calculator 405 calculates a tentative pitch angle P, a tentative roll angle R and a tentative yaw angle Φ as the azimuthal deviation angle from the first and second magnetic detection signals Mx and My and the first and second acceleration detection signals Ax and Ay. The tentative pitch angle P, the tentative roll angle R and the tentative yaw angle Φ are factors of the static angle.

The orientation angle detector further comprises a static angle correction definer 50 for defining accuracy of the static angle (P, R, Φ) to produce a correction signal when the static angle is defined to be accurate. The orientation angle calculator 60 corrects the integrated angle (ΣΔX, ΣΔY, ΣΔZ) to the orientation angle (α, β, γ).

Figure 5:
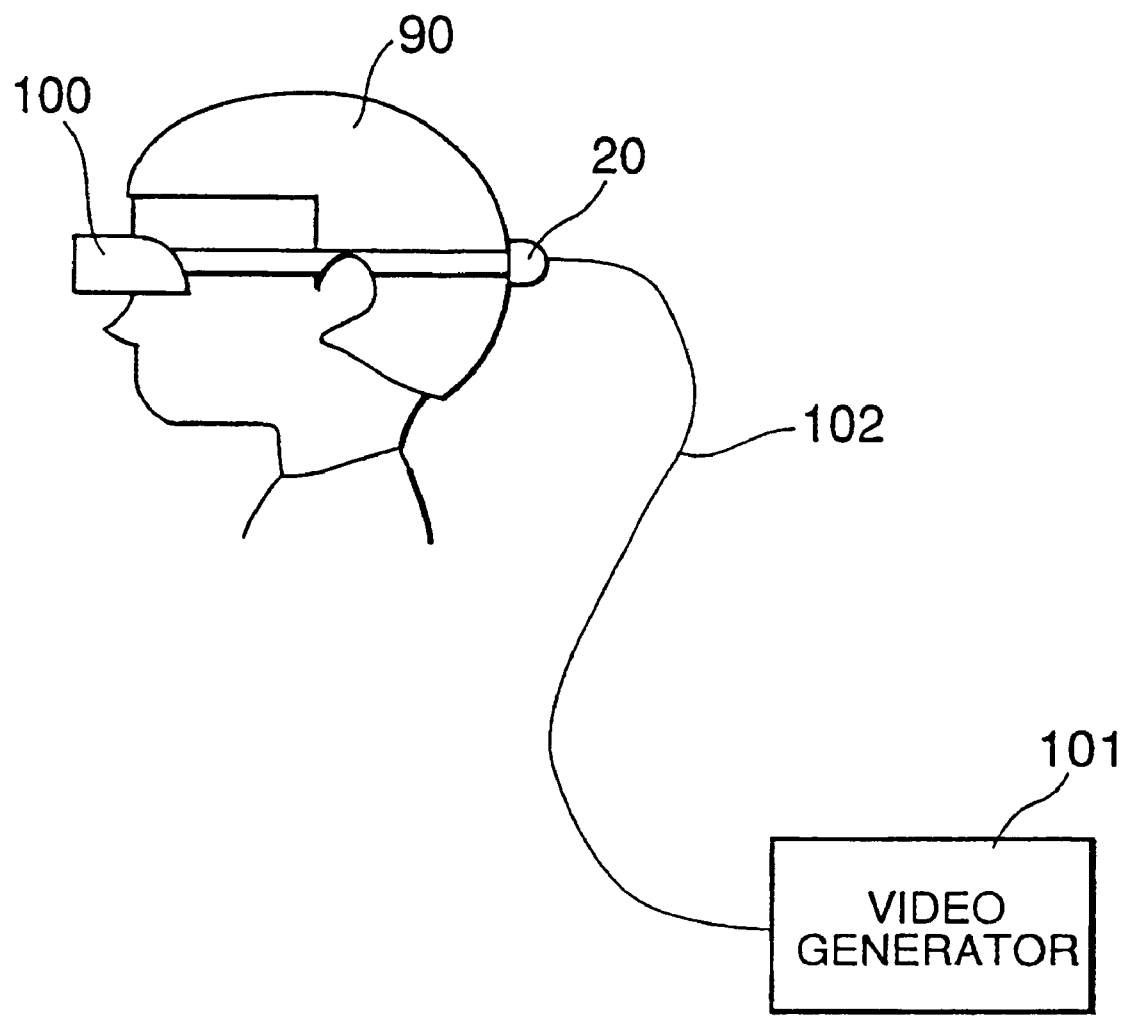
FIG. 5 is a schematic view illustrating use of the orientation angle detector in a HMD.

Referring to FIG. 5, the orientation angle detector is set on a user's head together with the HMD 100. The detector 20 and the HMD 100 are connected to a video generator 101 through a cable 102. A video signal is delivered to the HMD 100 from the video generator 101. The user can enjoy the video. When the user moves his head, the orientation angle of his head is detected by the orientation angle detector 20 and is transferred to the video generator 101. The video generator 101 changes or modulates the video signal by the orientation angle. Thus, the user can further modify the video by moving his head.

The first through third gyroscopes 301–303 are preferably Coriolis vibratory gyroscopes having piezoelectric vibrators.

First through third high-pass filters (H-Filter) 304–306 are coupled to the first through third Coriolis vibratory gyroscopes 301–303 for canceling offset voltages included in the first through third gyro outputs Jx, Jy and Jz of the first through Coriolis vibratory gyroscopes to produce first through third filter outputs, respectively.

Each of the first through third high-pass filters 304–306 is designed to have a cutoff frequency of 0.1 Hz or lower. The high-pass filter having the low cutoff frequency is slow from start to stable operation condition. Therefore, each of the first through third high-pass filters 304–306 preferably has a variable cutoff frequency. In the case, the cutoff frequency is adjusted relatively high just after a power switch for the detector is turned on so as to rapidly bring the filter to the stable operation condition. After being stable in operation, the high-pass filter can be adjusted to the low cutoff frequency of 0.1 Hz.

The first through third high-pass filters 304–306 are usually analogue type high-pass filters. In the case, the orientation angle detector further comprises first through third analogue-to-digital (A/D) convertors 307–309 coupled to the first through third high-pass filters 304–306. The first through third analogue-to-digital convertors 307–309 sample the first through third filter outputs every sampling intervals St, and produce first through third time-serial digital signals, respectively. The motion angle calculator 310 receives the first through third time-serial digital signals as incoming first through third time-serial digital signals to produce three time-serial moving angle signals (ΔX, ΔY, ΔZ) representing the motion angle.

The first through third time-serial moving angle signals represent time-serial X-moving angle ΔX(t), t=n, (n−1), (n−2)), . . . 1, n−(n−1)=St, time serial Y-moving angle ΔY(t), and time-serial ΔZ(t), the motion angle calculator (310) calculates X-moving angle ΔX(n), Y-moving angle ΔY(n) and Z-moving angle ΔZ(n) at t=n according to the following equation:

$$\begin{bmatrix} \Delta X(n) \\ \Delta Y(n) \\ \Delta Z(t) \end{bmatrix} =$$

$$\begin{bmatrix} 0 & \tan\beta(n-1)\sin\gamma(n-1) & \tan\beta(n-1)\cos\gamma(n-1) \\ 1 & \cos\gamma(n-1) & -\sin\gamma(n-1) \\ 0 & -\sin\gamma(n-1)/\cos\beta(n-1) & \cos\gamma(n-1)/\cos\beta(n-1) \end{bmatrix} \times \begin{bmatrix} Jx(n) \\ Jy(n) \\ Jz(n) \end{bmatrix}$$

where β(n−1) and γ(n−1) are the pitch angle β and roll angle γ at t=n−1 which are read out from the orientation angle memory 70, Jx(n), Jy(n) and Jz(n) being first through third digital signals of the first through third incoming time-serial digital signals at t=n.

The use of the high-pass filter enables to cancel the ofset voltage included in the gyro output. However, the filter output suffers from a distortion by action of a capacitor in the filter (at (c) in FIG. 7). In order to remove the distortion, the orientation angle detector preferably comprises three high-pass filter correction circuits 311 coupled between the first through third analogue-to-digital convertors 307–309 and the motion angle calculator 310, as shown by dotted lines in FIG. 3. The high-pass filter correction circuits 311 compensate the distortion accompanied at the first through third high-pass filters and produce first through third corrected signals. The first through third corrected signals are delivered to the motion angle calculator 310 as the first through incoming time-serial digital signals.

Each of the high-pass filter correction circuits 311 performs calculation given by the following equation:

$$J(n)=F(n)+(\alpha t/RC)\cdot \Sigma F(n)$$

where J(n) is the corrected signal which is a corresponding one of the incoming time-serial digital signals at t=n. F(n) is the digital value of the corresponding one of the first through third time-serial digital signals at t=n. $\Delta t/RC$ is a constant value.

Figure 6:
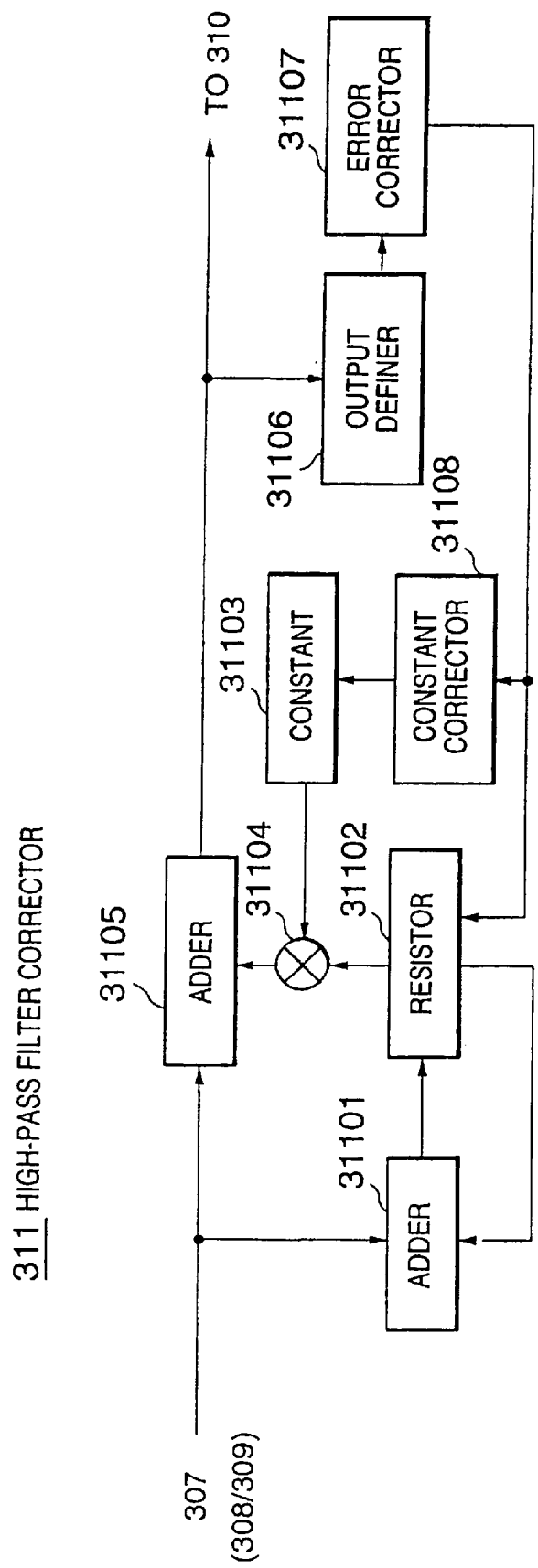
FIG. 6 is a schematic block circuit diagram of a high-pass filter corrector which can be used for correction of each of high-pass filters in the orientation angle detector of FIG. 3.

Referring to FIG. 6, each of the first through third high-pass filter correction circuit 311 comprises an integrator comprising a first adder 31101 and a registor 31102 for integrating the digital values of the corresponding time serial digital signal to hold an integrated value in the register 31102. A constant value generator 31103 is provided for generating the constant value. A multiplier 31104 is coupled to the registor 31102 and the constant value generator 31103 for multiplying the integrated value by the constant value to produce a multiplied value. A second adder 31105 is provided for adding the multiplied value to the digital values time-serially incoming to produce the corrected signal.

Figure 7:
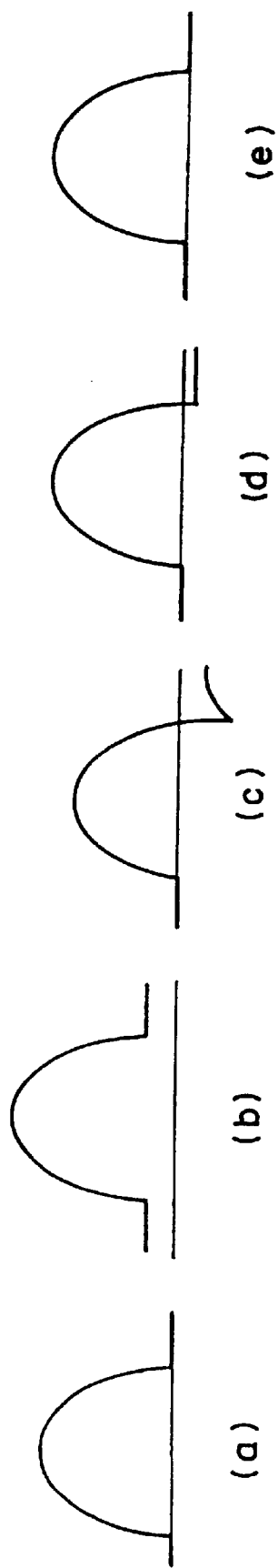
FIG. 7 shows signal waveforms at various points in FIG. 6.

Referring to FIG. 7, there are shown an input waveform (a) of a driving voltage for the Coriolis vibratory gyroscope, an output waveform (b), an output waveform (c) of the high-pass filter, and an output waveform (d) of the high-pass filter corrector 311 as described above. As seen from two waveforms (c) and (d), the distortion shown at (c) is removed at (d).

Referring to FIG. 6 again, the high-pass filter correction circuit 311 further comprises an offset error compensating circuit 31106-3108 for compensating an offset error caused by calculation in the integrator 31101–31102 and the second adder 31105. The offset error compensating circuit comprises an output definer 31106 for observing when the corrected signal is maintained constant, and defines the offset error level. An error corrector 31107 is coupled to the output definer 31106 and produces, in response to the error level, an error correction signal. The error correction signal is supplied to the registor 31102 which corrects, in turn, the integrated value. A constant value correction circuit 31108 is further coupled to the error corrector 31107 and corrects, in response to the error correction signal, the constant value of the constant value generator 31103.

Referring to FIG. 7 again, there is shown an output waveform (e) of the high-pass filter corrector 311 having the offset error compensating circuit 31106-3108. As is seen by comparing waveform (d) and the waveform (e), the output waveform of the high-pass filter corrector 311 is further improved.

The first through third high-pass filters can be of first through third digital high-pass filter devices to produce first through third time-serial digital filter outputs, respectivley.

Figure 8:
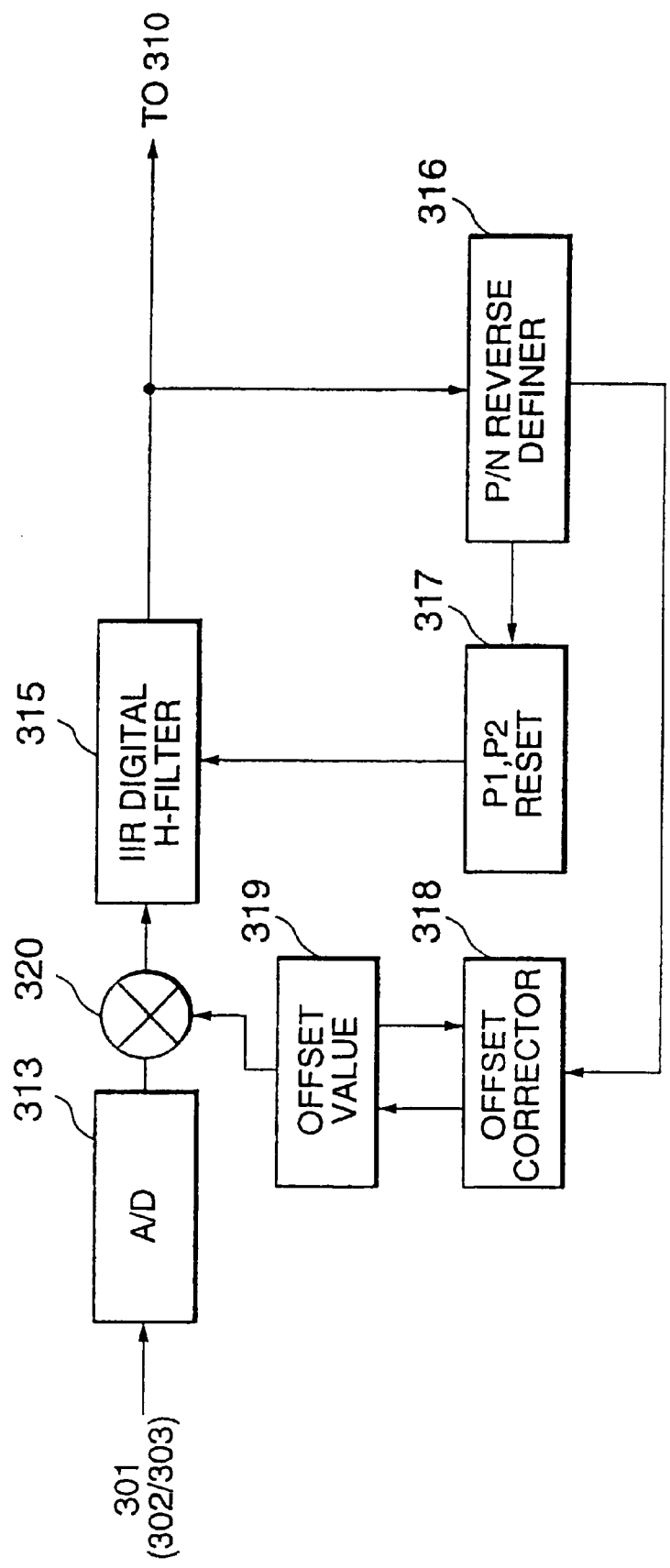
FIG. 8 is a schematic block diagram of a digital filter device which is used in place of each of the high-pass filters in the orientation angle detector of FIG. 3.

Referring to FIG. 8, each of the first through third digital high-pass filter devices (FIG. 8) comprises an analogue-to-digital convertor 313 coupled to a corresponding one of the first through third gyroscopes 301–303 for sampling a corresponding one of the first through third gyro outputs at sampling intervals St to produce a time-serial digital signal. A digital filter 315 is coupled to the analogue-to-digital convertor 313 for filtering the time-serial digital signal to produce a corresponding one of the first through third time-serial digital filter outputs. The motion angle calculator 310 receives the first through third time-serial digital filter outputs as the first through third incoming time-serial digital signals.

The first through third time-serial moving angle signals represent the time-serial X-moving angle $\Delta X(t)$, t=n, (n−1), (n−2), . . . 1, where St=n−(n−1), the time serial Y-moving angle $\Delta Y(t)$, and the time-serial $\Delta Z(t)$.

Figure 9:
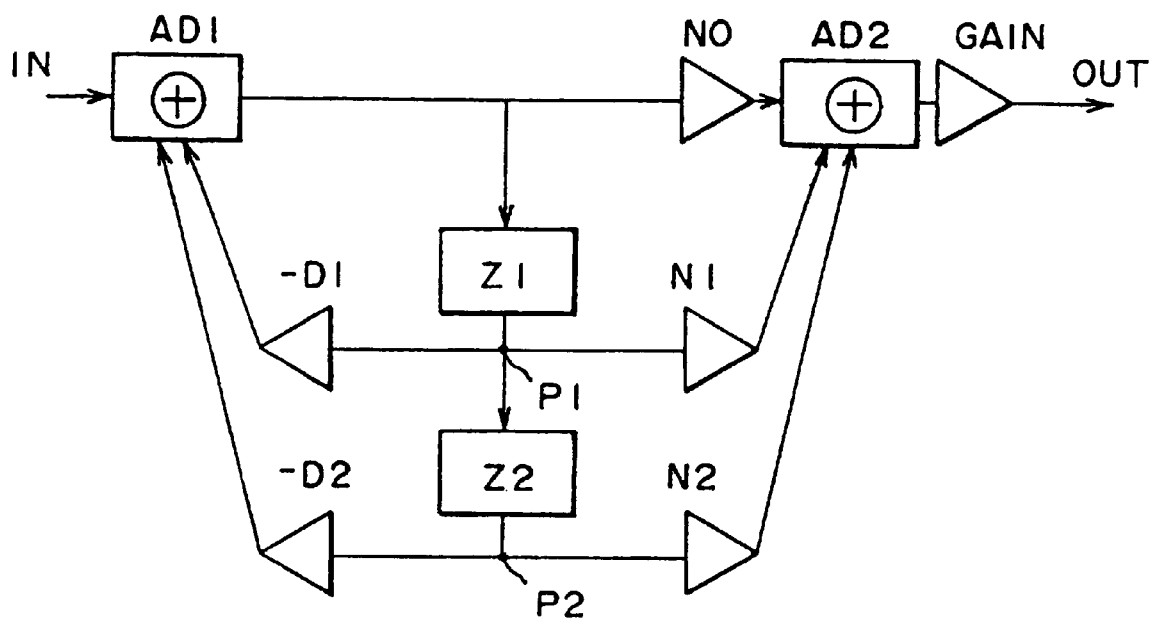
FIG. 9 is a schematic block circuit diagram of an IIR digital high-pass filter in the high-pass filter device of FIG. 8.

An example of the digital filter 315 is an infinite impulse response (IIR) type, for example, shown in FIG. 9. The IIR digital filter 315 has delay buffer values P1 and P2.

The digital high-pass filter device (FIG. 8) further comprises a positive/negative definer 316 coupled to an output side of the digital filter 315 for defining from the time-serial digital filter output when the time-serial digital signal changes between positive or negative to produce a change signal. A delay buffer value reset circuit 317 is coupled to the digital filter 315 and the positive/negative definer 316. The delay buffer value reset circuit 317 is responsive to the change signal to reset the delay buffer values P1 and P2 of the digital filter 315.

Figure 10:
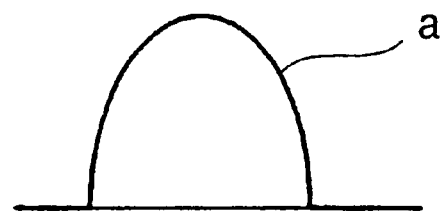
FIG. 10 shows signal waveforms at various points in FIG. 8.
Figure 10:
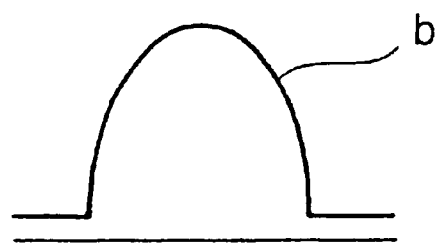
Figure 10:
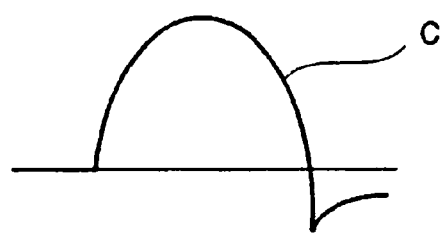
Figure 10:
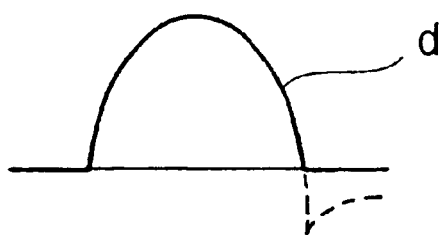
Figure 11A:
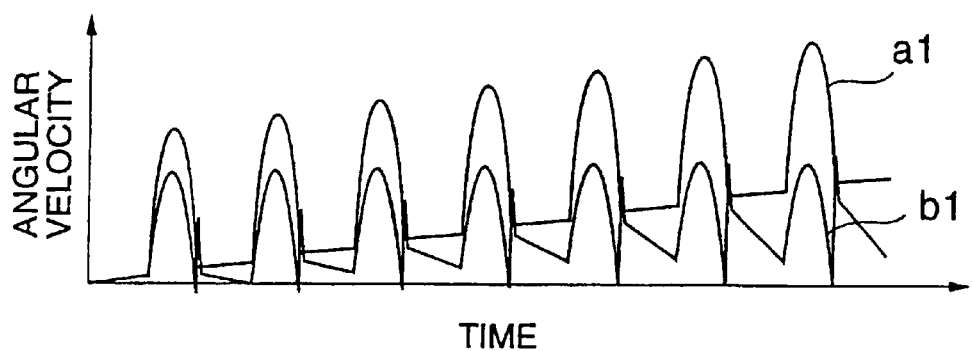
FIGS. 11A–11C show input and output signals at different conditions of the high-pass filter device of FIG. 8.

Referring to FIG. 10, there are shown various waveforms a–d. Waveforms a–c are similar to waveforms shown at (a)–(c) in FIG. 7 and waveform d is a waveform of an output of the digital high-pass filter device described above in connection with FIGS. 8 and 9. As shown in the waveform d, the distortion shown by a dotted line, which is present by use of analogue filter, can be removed by use of the digital high-pass filter device. FIG. 11A shows an input waveform a1 and an output waveform b1 in the digital high-pass filter device described above. As seen from the figure, a drift is not improved.

The digital high-pass filter device (FIG. 8) further comprises an offset value generator 319 for generating an offset value, a multiplier 320 coupled to the offset value generator 319. The multiplier 320 is disposed to connect the analogue-to-digital convertor 313 with the digital filter 315. The multiplier 320 is for multiplying the time-serial digital signal by the offset value. An offset value correcting circuit 318 is coupled to the offset value generator 319 and the positive/negative definer 316 and is responsive to the change signal to correct the offset value.

Figure 11B:
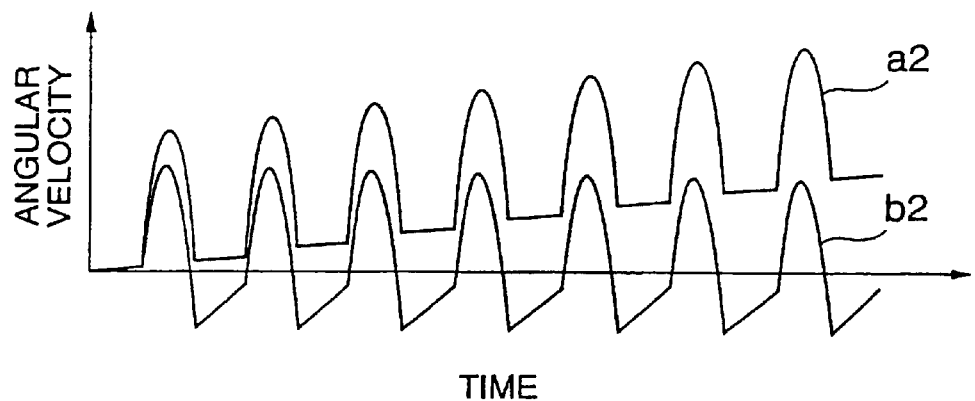

In a case where the correction is performed to set the offset value to a value of the time-time-serial digital filter just before the correction, the input and output waveforms of the digital filter are shown at a2 and a1 in FIG. 11B, respectively.

Figure 11C:
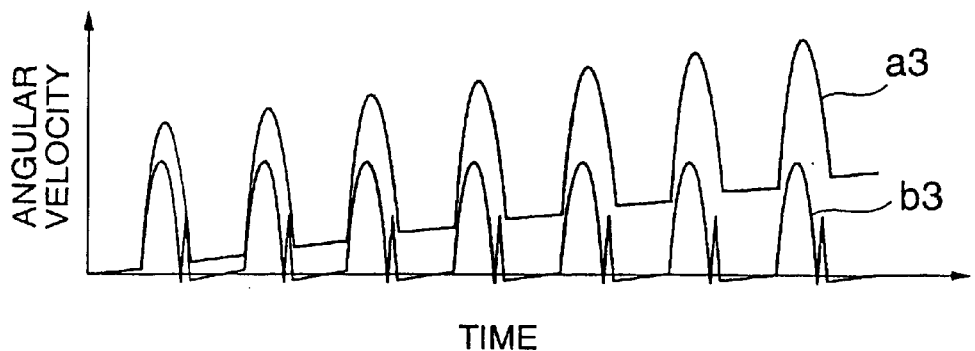

The correction of the offset value is preferably performed according to the following equation:

$$OS(n)=OS(n-1)-m\times[OS(n-1)-D(n-1)],$$

where OS(n) and OS(n−1) are offset values after and before correction, respectively, D(n−1) being a digital signal from the analogue digital convertor, and 0<m≦0.5. The correction of the offset value improves the drift in the output as seen from input and output waveforms a3 and b3 in FIG. 11C.

Figure 4:
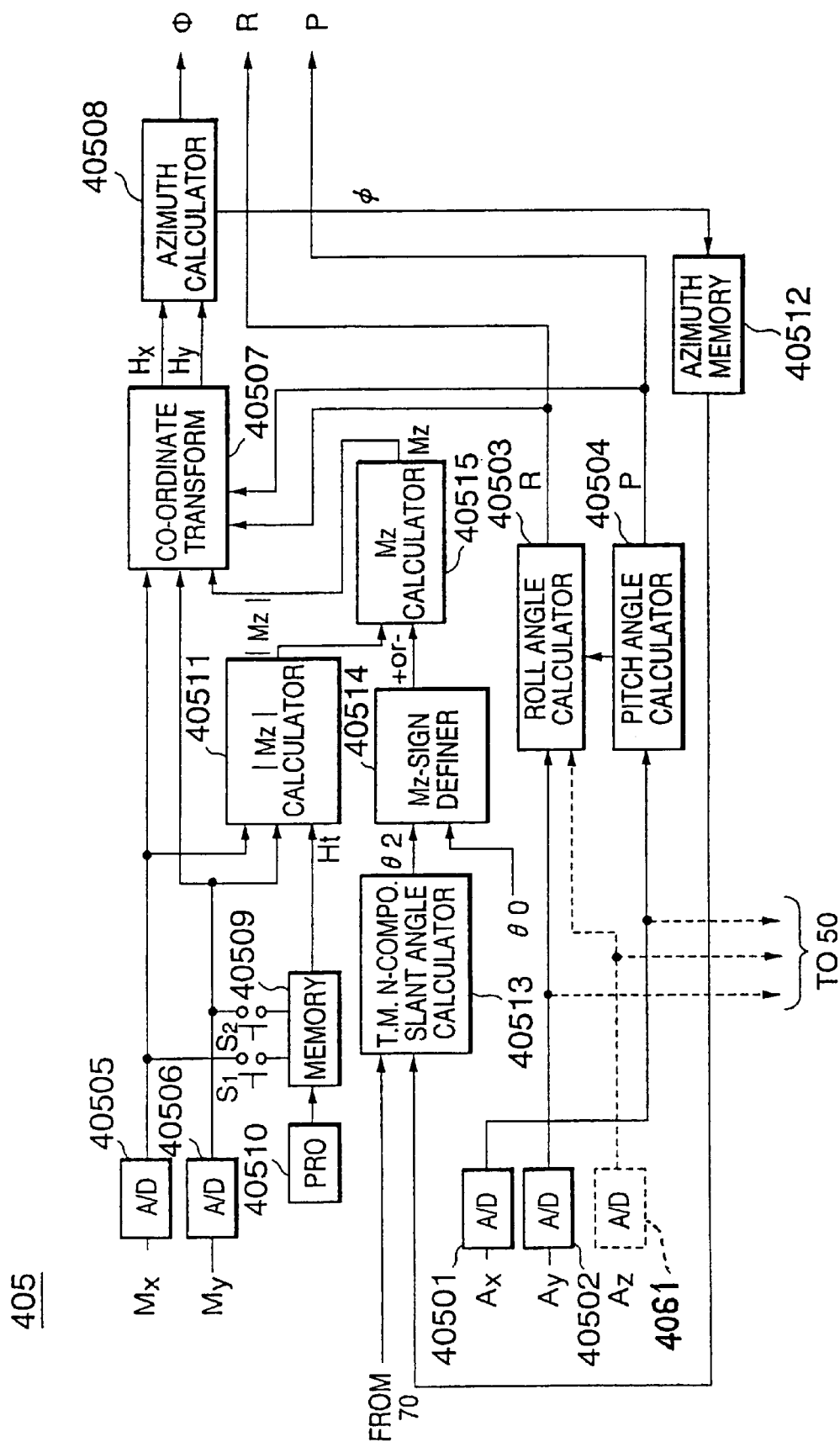
FIG. 4 is a schematic block circuit diagram of a static angle calculator in the orientation angle detector of FIG. 3.

Referring to FIG. 4; the static angle calculator 405 comprises first and second analogue-to-digital convertors 40501 and 40502 coupled to the first and second accelerometers 403 and 404. The first and second analogue-to-digital convertors 40501 and 40502 sample the first and second acceleration detection signals AX and Ay every sampling intervals St, and produce first and second time-serial digital acceleration signals. A tentative pitch angle calculator 40504 is coupled to the first analogue convertor 40501, and calculates the tentative pitch angle P from the first time-serial digital acceleration signal. A tentative roll angle calculator 40503 is coupled to the second analogue-to-digital convertor 40502 and the tentative pitch calculator 40504. The tentative roll angle calculator 40503 calculates the tentative roll angle R from the second time-serial acceleration signal and the tentative pitch angle P.

When the first and second time-serial digital acceleration signals are represented by Ax(t) and Ay(t), where t=n, n−1, . . . , 1, St=n−(n−1), the tentative pitch angle calculator 40504 and the tentative roll angle calculator 40503 calculate the tentative pitch angle P and the tentative roll angle R according to the following equations, respectively;

$$P(n)=\sin^{-1}Ax(n), \text{ and}$$

$$R(n)=\sin^{-1}[Ay(n)/\cos P(n)],$$

where P(n), R(n), Ax(n) and Ay(n) representing P, R, Ax(t) and Ay(t) at t=n.

The static angle calculator 405 further comprises third and fourth analogue-to-digital convertors 40505 and 40506 coupled to the first and second terrestrial magnetometers 401 and 402. The third and fourth analogue-to-digital convertors 40505 and 40506 sample the first and second magnetic detection signals Mx and My every sampling intervals St to produce first and second time-serial digital magnetic detection signals, respectively. A co-ordinate transforming calculator 40507 is coupled to the third and fourth analogue-to-digital convertors 40505 and 40506, the tentative roll angle calculator 40503, and the tentative pitch calculator 40504. The co-ordinate transforming calculator 40507 transforms the first and second time-serial digital magnetic detection signals into first and second time-serial digital terrestrial magnetic component signals representing two corresponding terrestrial magnetic components Hx and Hy in the X-Y plane of the reference X-Y-Z co-ordinate. An azimuth calculator 40508 is coupled to the co-ordinate transforming calculator 40507, and calculates an azimuth ψ from the terrestrial magnetic components Hx and Hy to produce a tentative yaw angle Φ as the azimuthal deviation angle. Further, an azimuth memory 40512 is coupled to the azimuth calculator 40508 for storing the azimuth ψ.

The static angle calculator 405 further comprises a Z-direction magnetic component generator 40509–40515 coupled to the third and fourth analogue-to-digital convertors 40505, 40506. The Z-direction magnetic component generator 40509–40515 produces a time-serial digital Z-direction magnetic component signal Mz from the first and second time-serial magnetic detection signals Mx and My, a terrestrial magnetism Ht previously measured, an initial slant angle θo of a Xs-Ys plane defined by Xs and Ys axes of the detector co-ordinate from the X-Y plane, and a current slant angle θ2 of the Xs-Ys plane from the X-Y plane.

The co-ordinate transforming calculator 40507 calculate the terrestrial magnetic components Hx and Hy from the first and second time-serial magnetic detection signals Mx and My, the time-serial digital Z-direction magnetic component signal Mz, and the tentative pitch and roll angles P and R, according to the following equations:

$$Hx(n) = \cos[P(n)] \times Mx(n) + \sin[P(n)] \times Mz(n),$$

and $$Hy(n) = \sin[R(n)] \times \sin[P(n)] \times Mx(n) + \cos[R(n)] \times \cos[P(n)] \times Mz(n),$$

where Hx(n), Hy(n), Mx(n), My(n), Mz(n), P(n) and R(n) represent Hx, Hy, Mx, My, Mz, P and R at t=n.

The azimuth calculator 40508 calculates ψ(n) of the azimuth ψ at t=n from Hx(n) and Hy(n) according to the following equation:

$$\psi(n)=-\tan^{-1}[Hy(n)/Hx(n)].$$

The azimuth calculator (40508) further calculates Φ (n) of the tentative yaw angle Φ at t=n from the ψ(n) and an initial azimuth deviation angle ψ(0) according to the following equation:

$$\Phi(n)=\psi(n)-\psi(0).$$

The Z-direction magnetic component generator 40509–40515 comprises a terrestrial magnetism generator (40509–40510) for producing the terrestrial magnetism Ht. A current Z-direction magnetic component absolute value calculator 40511 is coupled to the terrestrial magnetism generator 40509 and 40510, the third and fourth analogue-to-digital convertors 40505 and 40506. The current Z-direction magnetic component absolute value calculator 40511 calculates a Z-direction magnetic component absolute value |Mz(n)| from the terrestrial magnetism Ht, the current value Mx(n) and My(n) of the first and second time-serial magnetic detection signals Mx and My at t=n according to the following equation:

$$|Mz(n)|=[Ht^2-\{Mx(n)^2+My(n)^2\}]^{1/2}.$$

A current slant angle calculator 40513 is coupled to the orientation angle memory 70 and the azimuth memory 40512 and calculates the current slant angle θ2.

A sign definer 40514 is coupled to the current slant angle calculator 40513 and produces a sign (+or −) of the current Z-direction magnetic component Mz(n) from the current slant angle θ2 and the initial slant angle θ0.

A current Z-direction magnetic component calculator 40515 is coupled to the current Z-direction magnetic component absolute value calculator 40511 and the sign definer 40514) and produces the Z-direction magnetic component Mz(n).

The terrestrial magnetism generator (40509–40510) comprises an initial terrestrial magnetism memory 40509 selectively coupled to the third and fourth analogue digital convertors 40505 and 40506 through two switching elements S1, S2, respectively. The initial terrestrial magnetism memory 40509 previously stores an initial X-direction, Y-direction and Z-direction terrestrial magnetic components Mx(0), My(0) and Mz(0), which are given from the third and fourth analogue-to-digital convertors 40505 and 40506 through the two switch elements S1 and S2 selectively turned on at initial time.

A processor 40510 is coupled to the initial terrestrial magnetism memory 40509 and processes the initial X-direction, Y-direction and Z-direction terrestrial magnetic components Mx(0), My(0) and Mz(0) into the terrestrial magnetism Ht according to the following equation:

$$|Ht|=[Mx(0)^2+My(0)^2+Mz(0)^2]^{1/2}.$$

Thus, the absolute value |Ht| of the terrestrial magnetism is memorized in the initial terrestrial magnetism memory 40509.

Now, it is described to store the initial X-direction, Y-direction and Z-direction terrestrial magnetic components Mx(0), My(0) and Mz(0) into the initial terrestrial magnetism memory 40509.

At initial state, the orientation angle detector is, on one hand, positioned so that a particular one of the first and second terrestrial magnetometers 401 and 402 is in parallel with the Z axis of the reference co-ordinate. Then, a corresponding one of the two switch elements S1 and S2 is turned on to memorize the terrestrial magnetic component detected by the particular terrestrial magnetometer (401 or 402) in the initial terrestrial magnetism memory 40509 as the initial Z-direction terrestrial magnetic component Mz(0). Thereafter, the orientation angle detector is, on the other hand, positioned so that the first and second terrestrial magnetometers 401 and 402 are in parallel with the X and Y axes of the reference co-ordinate, respectively. Then, the two switch elements S1 and S2 are turned on. As a result, the terrestrial magnetic components detected by the first and second magnetometers 401 and 402 are stored in the initial terrestrial magnetism memory 40509 as the initial X-direction terrestrial magnetic component Mx(0) and the initial Y-direction terrestrial magnetic component My(0).

The current slant angle calculator 40513 calculates the current slant angle $\theta 2$ from an angular value $\psi(n-1)$ of the azimuth $\psi$ at t=n-1 read out from the azimuth memory 40512, and roll and pitch angle values $\beta(n-1)$ and $\gamma(n-1)$ of the roll and pitch angles $\beta$ and $\gamma$ read out from the orientation angle memory 70, according to the following equation:

$$\theta 2 = \sin^{-1}[aa/(aa^2+cc^2)^{1/2}],$$

where, $aa = \cos \gamma(n-1) \times \sin \beta(n-1) \times \cos \psi(n-1) \times \sin \psi(n-1)$ and $cc = \cos \gamma(n-1) \times \cos \beta(n-1)$.

The sign definer 40514 defines, on one hand, the sign as positive (+) when the current slant angle $\theta 2$ is larger than the initial slant angle $\theta 0$ but is smaller than 90 angular degree, and defines, on the other hand, the sign as negative (−) when the current slant angle $\theta 2$ is equal to or smaller than the initial slant angle $\theta 0$ but is larger than −90 angular degree.

Returning to FIG. 3, the orientation angle detector further comprises a static angle correction definer 50 coupled to the static angle calculator 405 and the orientation angle calculator 60. The static angle correction definer 50 is for defining accuracy of the static angle (P, R, Φ) to produce a correction signal. Then, the orientation angle calculator 60 is responsive to the correction signal to calculate a correction value. Then, the orientation angle calculator 60 corrects the integrated value set by the correction value and produces a modified value set. The modified value set is delivered as the orientation angle ($\alpha$, $\beta$, $\gamma$) The orientation angle calculator 60 calculates first through third integrated values $\Sigma\Delta X$, $\Sigma\Delta Y$ and $\Sigma\Delta Z$ according to the following equations:

$$\Sigma\Delta X(n) = \gamma(n-1) + \Delta X(n);$$

$$\Sigma\Delta Y(n) = \beta(n-1) + \Delta Y(n); \text{ and}$$

$$\Sigma\Delta Z(n) = \alpha(n-1) + \Delta Z(n),$$

where $\Delta X(n)$, $\Delta Y(n)$ and $\Delta Z(n)$ are the X-moving angle $\Delta X$, the Y-moving angle $\Delta Y$ and the Z-moving angle $\Delta Z$, respectively, at a time t=n, and $\gamma(n-1)$, $\beta(n-1)$ and $\alpha(n-1)$ are the roll angle $\gamma$, the pitch angle $\beta$ and the roll angle $\alpha$, respectively at a time t=n-1. Those $\gamma(n-1)$, $\beta(n-1)$ and $\alpha(n-1)$ are readout from orientation angle memory 70.

When the orientation angle calculator 60 receives the correction signal, the orientation angle calculator 60 calculates first through third angular errors Ex, Ey and Ez by the following equations:

$$Ex = \Sigma\Delta X(n) - (n);$$

$$Ey = \Sigma\Delta Y(n) - P(n); \text{ and}$$

$$Ez = \Sigma\Delta Z(n) - \Phi(n).$$

Then, the orientation angle calculator 60 determines first through third correction values C1, C2, and C3 as the correction value from the first through third angular errors Ex, Ey and Ez, and calculates the first through third modified values as the roll angle $\gamma$, the pitch angle $\beta$ and the yaw angle $\alpha$ by the following equations:

$$\gamma = \Sigma\Delta X(n) - C1;$$

$$\beta = \Sigma\Delta Y(n) - C2; \text{ and}$$

$$\alpha = \Sigma\Delta Z(n) - C.$$

In this connection, the values of C1, C2 and C3 can be selected to be smaller than the first through third angular errors Ex, Ey, and Ez, respectively. Alternatively, the value of C1, C2, and C3 can be determined by k1×Ex, k2×y, and k3×Ez, respectively, where k1, k2 and k3 are constant values smaller than 1.

The orientation angle detector can preferably be provided with a correction coefficient generator 80 as shown in the figure. The correction coefficient generator 80 is coupled to the static angle calculator 405 and the orientation angle calculator 60 and generates a set of first through third coefficients m1, m2 and m3. The first through third coefficients m1, m2 and m3 are selected from predetermined different values in response to angular values of the tentative pitch angle P and the tentative roll angle R received from the static angle calculator 405.

Preferably, the correction coefficient generator 80 has a table as shown in Table 1 below. The table has various sets of the first through third coefficients m1, m2 and m3 previously determined in correspondence to angular values of the tentative pitch angle P and the tentative roll angle R.

Generally, the first through third coefficients m1, m2 and m3 are determined relatively low for large angular values of the tentative pitch angle P and the tentative roll angle R.

TABLE 1

| | | R(deg) | | | | | |
|---|---|---|---|---|---|---|---|
| | | 0–60 | | 60–70 | | 70–90 | |
| P(deg) | 0–60 | m1 | 1 | m1 | 0.7 | m1 | 0.3 |
| | | m2 | 1 | m2 | 1 | m2 | 1 |
| | | m3 | 1 | m3 | 0.7 | m3 | 0.3 |
| | 60–70 | m1 | 1 | m1 | 0.7 | m1 | 0.3 |
| | | m2 | 0.7 | m2 | 0.7 | m2 | 0.7 |
| | | m3 | 0.7 | m3 | 0.7 | m3 | 0.3 |
| | 70–90 | m1 | 1 | m1 | 0.7 | m1 | 0.3 |
| | | m2 | 0.3 | m2 | 0.3 | m2 | 0.3 |
| | | m3 | 0.3 | m3 | 0.3 | m3 | 0.3 |

The orientation angle calculator 60 is responsive to the set of first through third coefficients m1, m2 and m3 to modify the first through third correction values C1, C2 and C3 by multiplying with the first through third coefficients m1, m2 and m3, respectively.

Now, description will be made as regards the detail of the correction definer 50. The correction definer 50 is provided with a static angle memory 501 for storing the tentative pitch angle P and the tentative roll angle R received from the static angle calculator 405. The correction definer 50 compares the tentative pitch angle P(n) and tentative roll angle R(n) received at a time t=n with the earlier tentative pitch angle P(n−1) and tentative roll angle R(n−1) at t=n−1 which are read from the static angle memory 501, and defines the tentative pitch angle P(n) and tentative roll angle R(n) to be accurate when the following two equations (1) and (2) are fulfilled, respectively:

$$|R(n)-R(n-1)|-B\approx 0 \qquad (1); \text{ and}$$

$$|P(n)-P(n-1)|-D\approx 0 \qquad (2),$$

where B and D are positive values as selected.

In an example, B and D are predetermined as small values nearly equal to zero (0) which the correction definer 50 previously has therein.

In another example, the correction definer 50 is connected to the motion angle calculator 310 and receives the X-moving angle ΔX(n) and the Y-moving angle ΔY(n) therefrom. B and D are selected to be the X-moving angle ΔX(n) and the Y-moving angle ΔY(n), respectively.

Further, the correction definer 50 can be made to define accuracy of the tentative yaw angle Φ. The correction definer 50 receives the tentative yaw angle Φ(t) and the Z-moving angle ΔZ(t) from the static angle calculator 405 and motion angle calculator 310, respectively. The tentative yaw angle Φ(t) is stored in the static angle memory 501. The correction angle definer 50 processes the tentative yaw angle Φ(n) and the Z-moving angle ΔZ(n) at t=n and the yaw angle Φ(n−1) at t=n−1 which is read from the orientation angle memory 501, according to the following equation (3):

$$|\Phi(n)-\Phi(n-1)|-\Delta Z(n)\approx 0 \qquad (3).$$

The correction angle definer 50 defines the tentative yaw angle Φ(n) to be accurate when the equation (3).

In the correction definer 50, the moving average of the motion angle can be used for defining the static angle.

The correction angle definer 50 stores in the static angle memory 501 the X-moving angle ΔX, the Y-moving angle ΔY and the Z-moving angle ΔZ received from the motion angle calculator 310 as well as the tentative pitch angle P(n), the tentative roll angle R(n) and the tentative yaw angle Φ(n) received from the static angle calculator 405. The correction definer 50 calculates a moving average of variation of the tentative pitch angle P(t), a moving average of variation of the tentative roll angle R(t), a moving average of variation of the tentative yaw angle φ(n), a moving average of the X-moving angle ΔX(t), a moving average of the Y-moving angle ΔY(t) and a moving average of the Z-moving angle ΔZ(t). Then, the correction definer 50 defines the tentative pitch angle P(n), the tentative roll angle R(n) and the tentative yaw angle Φ(n) to be accurate when the following two equations (4), (5) and (6) are fulfilled, respectively:

$$[R(n)-R(n-1)]/C-[\Delta X(n)+\Delta X(n-1)+\ldots+\Delta X(n-C+1)]/C\approx 0 \qquad (4);$$

$$[P(n)-P(n-1)]/C-[\Delta Y(n)+\Delta Y(n-1)+\ldots+\Delta Y(n-C+1)]/C\approx 0 \qquad (5):$$

and $$[\Phi(n)-\Phi(n-1)]/C-[\Delta Z(n)+\Delta Z(n-1)+\ldots+\Delta Z(n-C+1)]/C\approx 0 \qquad (6).$$

As a result of the defining the accuracy of the static angle, the correction definer 50 produces the correction signal when at least one of the tentative pitch angle P(n), and the tentative roll angle R(n) is defined accurate, and the correction definer 50 produces a non-correction signal when none of the tentative pitch angle and the tentative roll angle R(n) is defined accurate. In response to the non-correction signal, the orientation angle calculator 60 is to produces the integrated value set of ΣΔX(n), ΣΔY(n) and ΣΔZ(n) as the orientation angle (γ, β, α).

In execution to define accuracy of the tentative yaw angle Φ(n), the correction definer 50 also produces the correction signal when the tentative yaw angle Φ(n) is defined accurate but in no relation to whether or not the tentative pitch angle and the tentative roll angle R(n) are defined accurate. When none of the tentative pitch angle, the tentative roll angle R(n) and the yaw angle Φ(n) is defined accurate, the correction definer 50 produces the non-correction signal.

In a different design, the correction definer 50, upon defining accuracy of particular ones of the tentative roll angle R, the tentative pitch angle P and the tentative yaw angle Φ, can produce, as the correction signal, an indication signal representative of that particular ones of the tentative roll angle R, the tentative pitch angle P and the tentative yaw angle Φ which are defined accurate. In response to the indication signal, the orientation angle calculator 60 modifies specific ones of the first through third integrated values ΣΔX(n), ΣΔY(n) and ΣΔZ(n) corresponding to the particular ones of the tentative roll angle R, the tentative pitch angle P and the tentative yaw angle Φ by use of the tentative pitch angle P, the tentative roll angle R and the tentative yaw angle Φ to produce specific modified values. Then, the orientation angle calculator 60 delivers the specific modified values as that specified ones of the roll angle γ, the pitch angle β and the yaw angle α, respectively, which are corresponding to the specific ones of the first through third integrated values ΣΔX(n), ΣΔY(n) and ΣΔZ(n). The orientation angle calculator 60 also delivers the remaining ones other than the specific ones of the first through third integrated values ΣΔX(n), ΣΔY(n) and ΣΔZ(n) as the remaining ones other than the specified ones of the roll angle γ, the pitch angle β and the yaw angle α.

Figure 12:
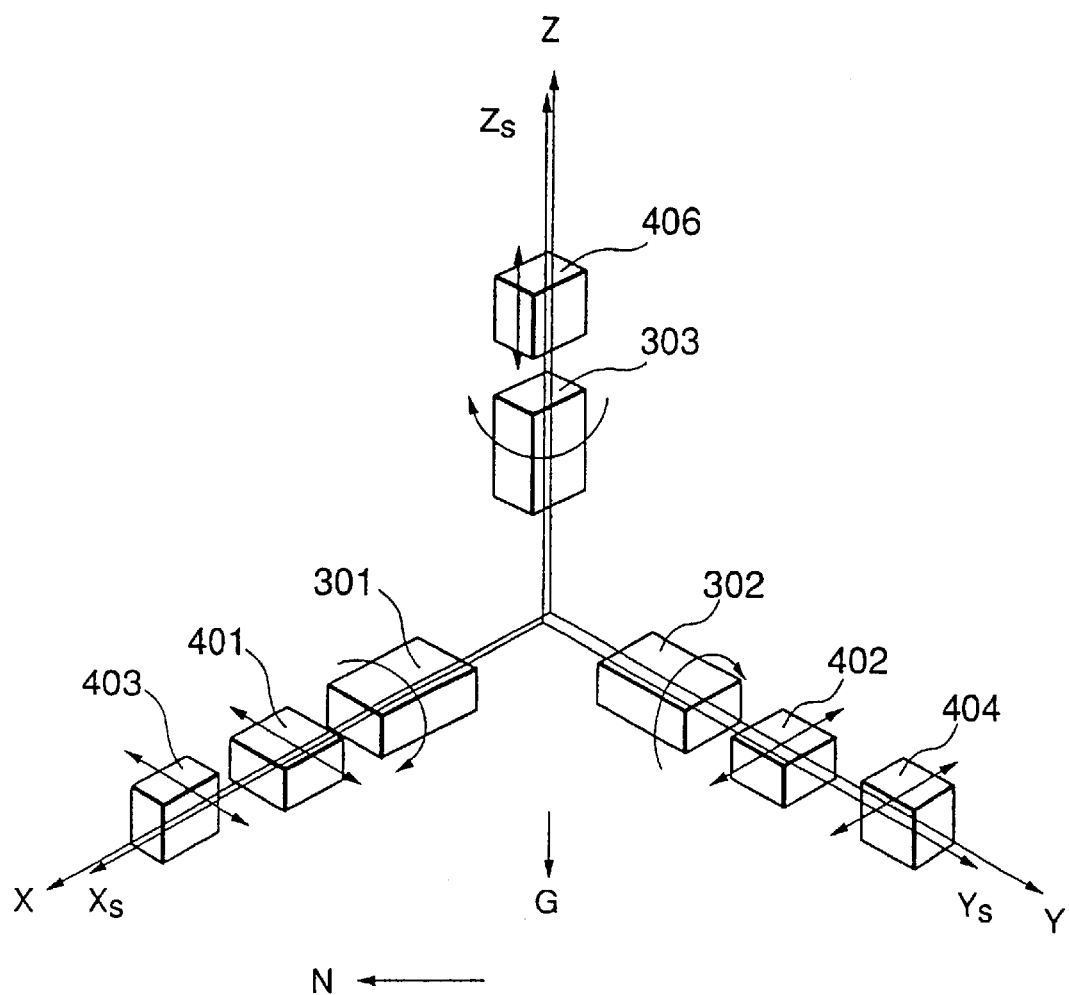
FIG. 12 is a schematic view illustrating disposition of rate gyros, accelerometers, and terrestrial magnetometers in an orientation angle detector according to another embodiment of this invention.

Referring to FIG. 12, an orientation angle detector according to another embodiment of this invention uses a third accelerometer 406 disposed in parallel with Zs-axis of the detector co-ordinate to produce a third acceleration detection signal Az. In this embodiment, the static angle calculator 405 further comprises an additional analogue-to-digital convertor 4061, as shown by dotted lines in FIG. 4.

The additional analogue-to-digital convertor 4061 is coupled to the third accelerometer 406 and samples the third acceleration detection signal Az every sampling intervals St to produce a third time-serial digital acceleration signal. The third time-serial acceleration signal is additionally used in the roll angle calculator 40504 for calculating the tentative roll angle R.

The first, second and third time-serial digital acceleration signals are represented by Ay(t) and Az(t), where t=n, n−1, . . . 1, St=n−(n−1), the tentative roll angle calculator 40503 calculate the tentative roll angle R according to the following equations, respectively;

when Az>0, $R(n)=\sin^{-1}[Ay(n)/\cos P(n)]$, when Az<0 and Ax>0

$R(n)=\pi-\sin^{-1}[Ay(n)/\cos P(n)]$, and when Az<0 and Ax<0, $R(n)=-\pi-\sin^{-1}[Ay(n)/\cos P(n)]$, where P(n), R(n), Ay(n) and Az(n) representing P, R, Ax(t) Ay(t) and Az(t) at t=n.

Figure 3:
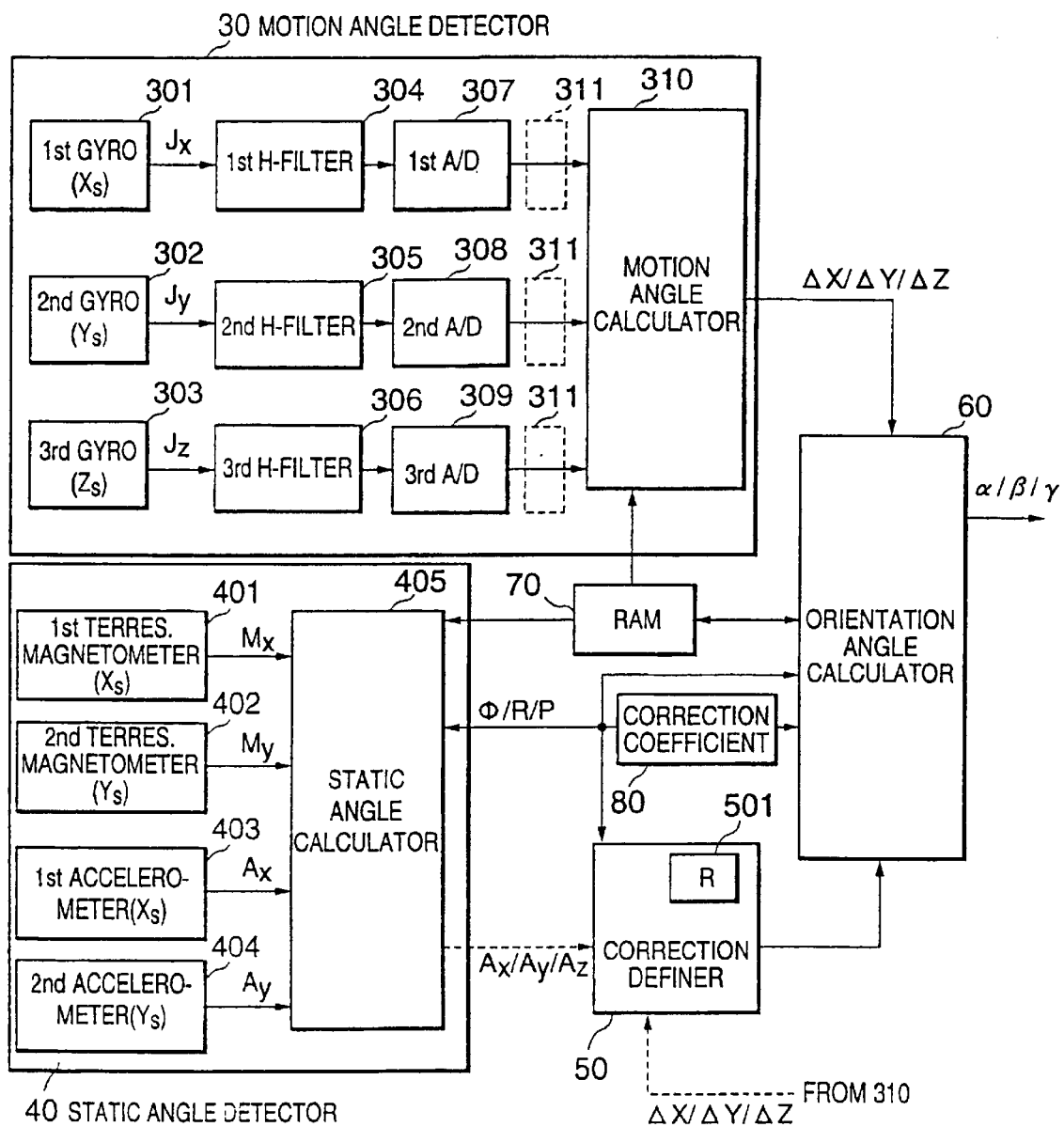
FIG. 3 is a schematic block circuit diagram of the orientation angle detector according to an embodiment of this invention.

In the present embodiment, the static angle correction definer 50 receives the first, second and third acceleration detection signals (Ax, Ay, Az) as shown by dotted lines in FIGS. 3 and 4. From the first, second and third acceleration detection signals (Ax, Ay, Az), the correction definer 50 calculates an absolute value of a composite acceleration vector of acceleration of Xs-axis direction, Ys-axis direction, and Zs-axis direction, according to the following equation:

$$|A|=(Ax+Ay+Az)^{1/2}.$$

The correction definer (50) produces the correction signal when the $|A|\approx 1G$, G being the gravity acceleration.

Another aspect of this invention provides a circuit assembly including the Coriolis vibratory gyroscopes which enables to simplify assembling the orientation angle detector using the Coriolis vibratory gyroscopes.

Figure 13A:
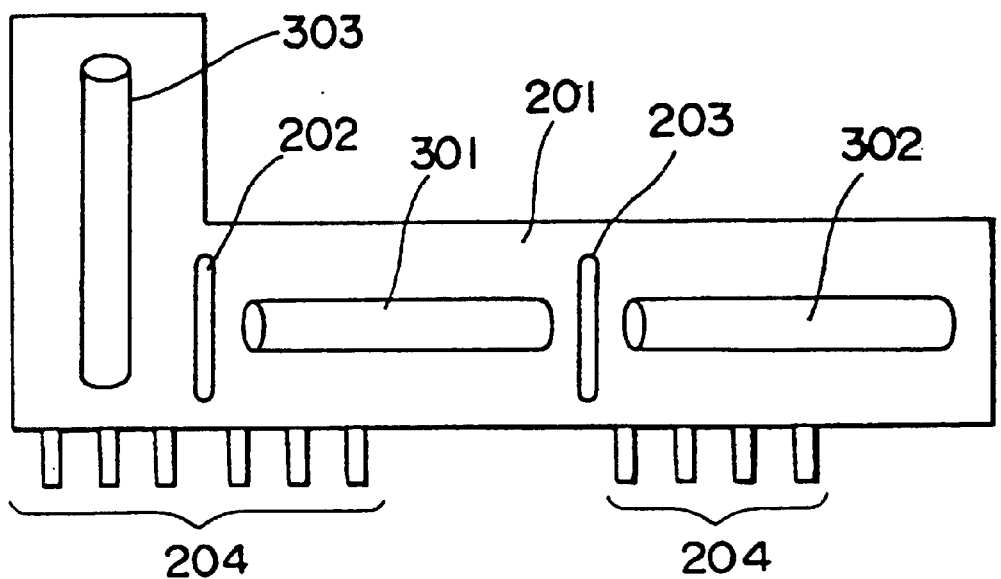
FIGS. 13A and 13B are a development view and a bent view of a rate gyro assembly which can be used in the orientation angle detectors shown in FIGS. 1–12.
Figure 13B:
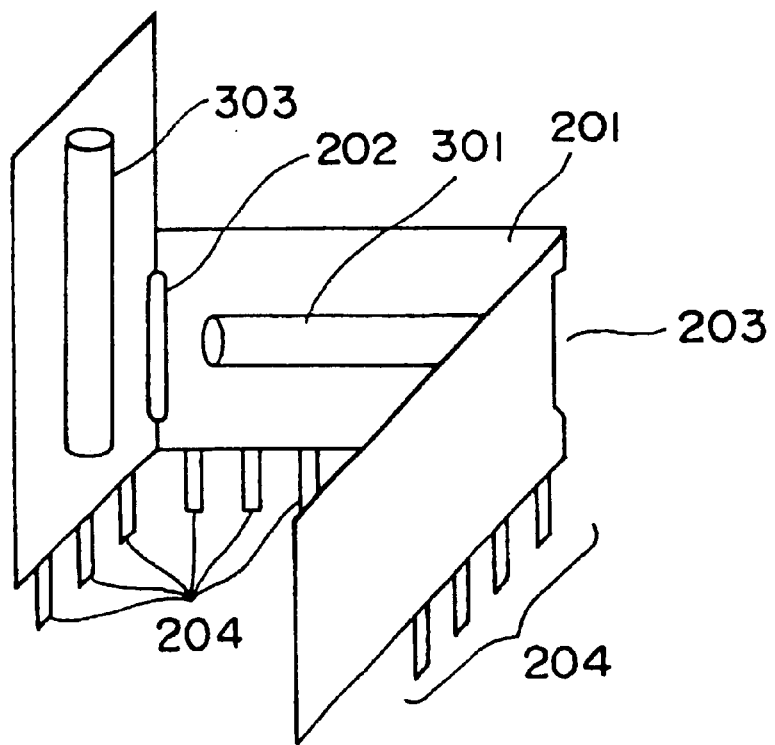

Referring to FIG. 13A and 13b, three piezoelectric ceramic vibrators of the first through third gyroscopes gyroscope 301–303 are fixedly mounted on three sections of a flexible printed circuit board 201, respectively. The flexible printed circuit board 201 is bent to form a right-angled triangular cylinder, as shown in FIG. 11B, having a first and a second side plate sections perpendicular to each other and a third side plate section to form a right-angled triangular cylinder. The flexible printed circuit board 201 has two slits 202 and 203 at bent portions so as to facilitate the bending operation.

After mounting the first through third piezoelectric ceramic vibrators 301, 302, and 303 on the flexible printed circuit 201, the flexible printed circuit board 201 is bent to form the triangular cylinder. Then, the first through third piezoelectric ceramic vibrators of the first through third gyroscopes 301, 302, and 303 are automatically disposed in parallel with Xs-axis, Y-axis and Zs-axis of the detection co-ordinate.

The flexible printed circuit board 201 has an end edge of the right-angled triangular cylinder which extends on a single plane, and terminals 204 extending from the end edge. The terminals 204 are for electrical connection with external electric parts. The third side plate section extends in a direction opposite to the end edge beyond the first and second side plate sections so that the third gyroscope 303 in the Z-axis is reliably mounted on the flexible printed circuit board.

In place of the single flexible printed circuit board 201, three printed circuit boards can be used for the first through third side plate portions, respectively.

In the Coriolis vibratory gyroscopes used in the orientation angle detector according to this invention, any type piezoelectric vibrator can be used but is preferably made of non-magnetic piezoelectric materials of, for example, piezoelectric ceramics, piezoelectric single crystal material, and silicon.

In certain applications of the orientation angle detector, two factors (for example, pitch and yaw angles) of the orientation angle are only required without use of the other factor (roll angle). Another embodiment of this invention is directed to a two-dimensional (2-D) orientation angle detector which is used in such applications.

Figure 14:
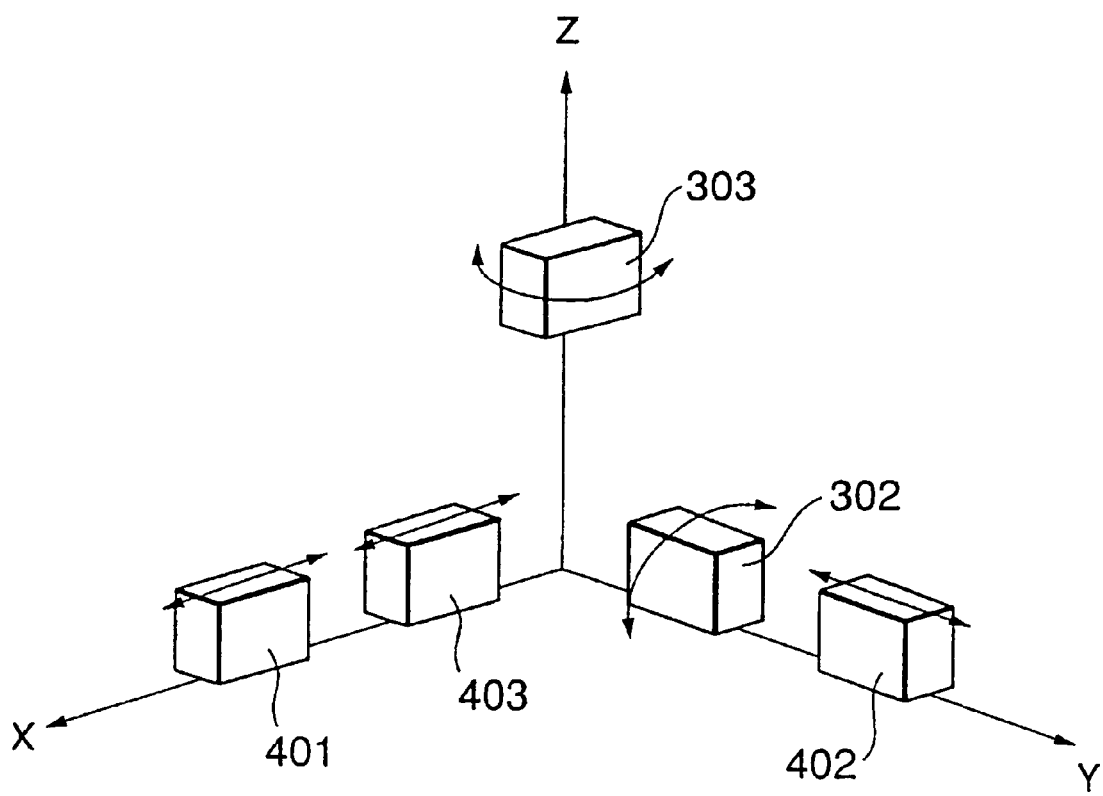
FIG. 14 is a schematic view illustrating disposition of rate gyros, an accelerometer, and terrestrial magnetometers in an orientation angle detector according to another embodiment of this invention.
Figure 15:
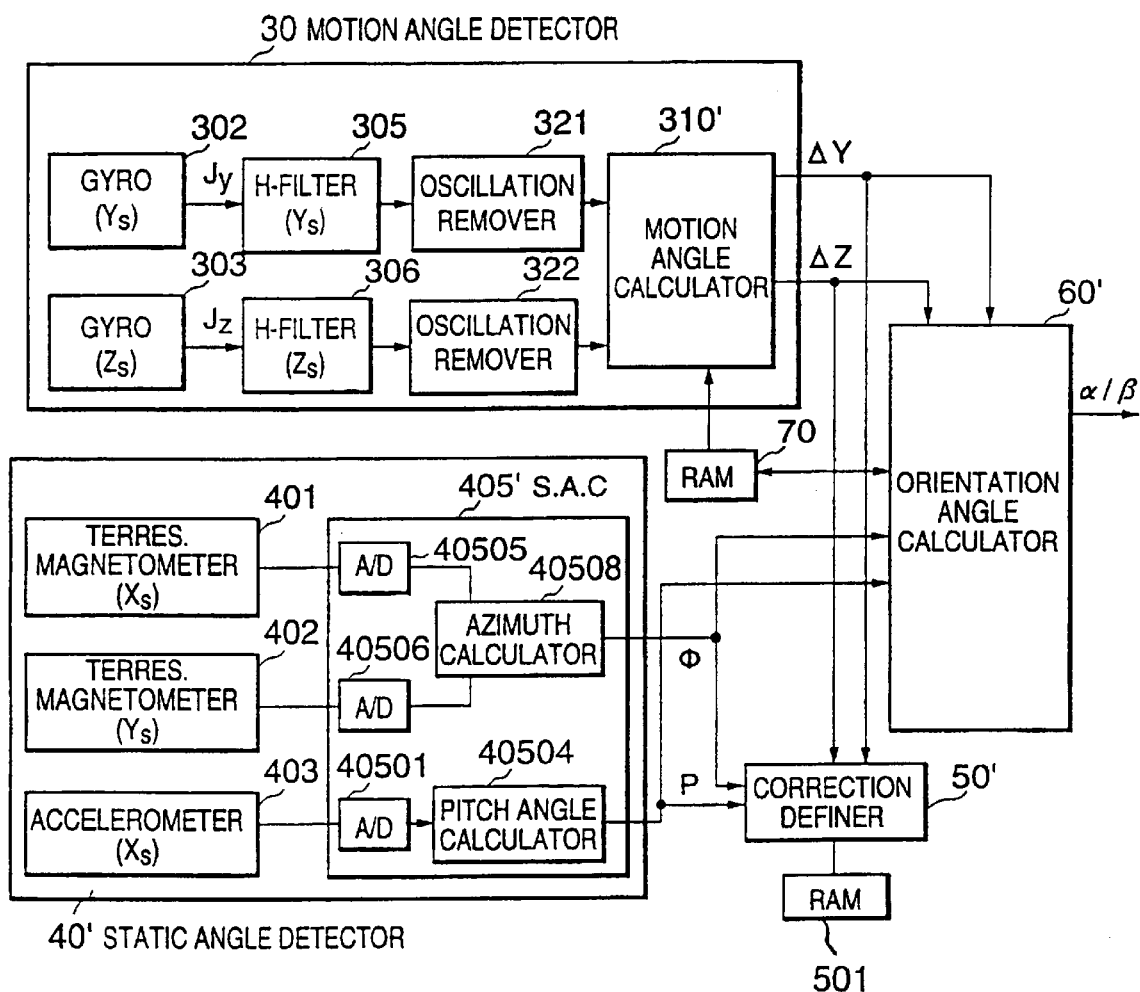
FIG. 15 is a schematic block circuit diagram of the orientation angle detector of FIG. 14.

Referring to FIGS. 14 and 15, the 2-D orientation angle detector shown therein is similar to the 3-D orientation angle detector shown in FIGS. 1–11, except that one of three gyroscopes and parts and functions accompanied thereto are omitted. The similar parts are represented by the same reference symbols with or without prim (').

The 2-D orientation angle detector delivers only the yaw angle α and the pitch angle β as a 2-D orientation angle. First and second gyroscopes 302 and 303 are disposed in parallel with the Ys and Zs axes, as shown in FIG. 14. First and second gyroscopes 302 and 303 are corresponding to second and third gyroscopes 302 303 in FIG. 1 for measuring first and second angular velocities Jy and Jz, respectively.

A motion angle calculator 310' calculates, from the first and second angular velocities Jy and Jz, a Y-moving angle ΔY around the Y axis, and a Z-moving angle ΔZ around Z axis as two factors of the motion angle.

Figure 2:
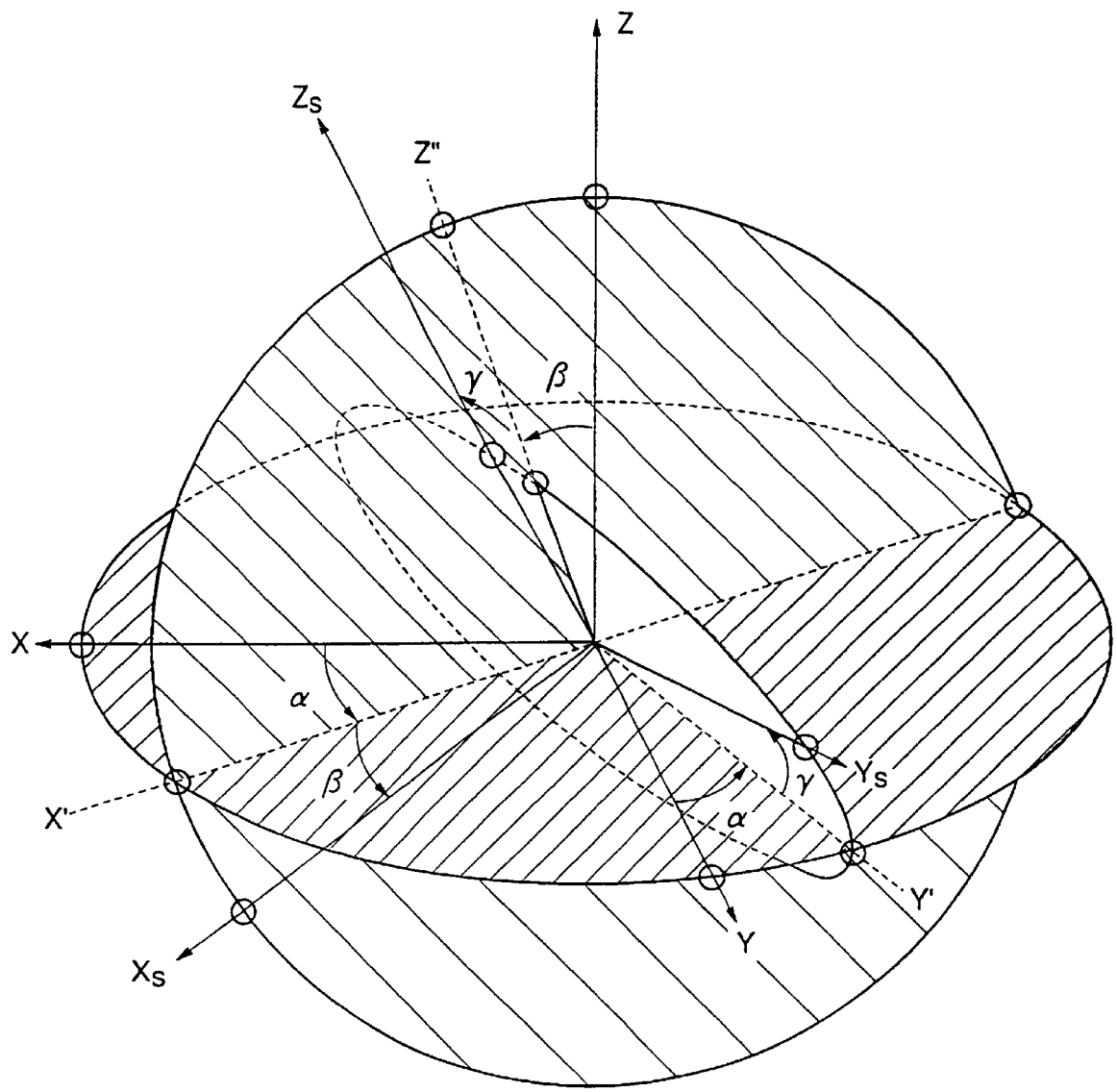
FIG. 2 is a schematic view illustrating a relationship between a spatial 3-D reference co-ordinate and a 3-D co-ordinate of the detector itself after moved from the reference co-ordinate.

First and second terrestrial magnetometers 401 and 402 are disposed in parallel with Xs and Ys axes for producing first and second magnetic detection signals (Mx, My), respectively, and an accelerometer 403 is disposed in parallel with Xs axis for producing an acceleration detection signal (Ax), as shown in FIG. 14, as is similar to FIG. 1. A static angle calculator 405' calculates a tentative pitch angle P and a tentative yaw angle Φ as the azimuthal deviation angle from the first and second magnetic detection signals (Mx, My) and the acceleration detection signal (Ax).

An orientation angle calculator 60' calculates an integrated value set of first and second integrated values (ΣΔY, ΣΔZ) by time integration of the Y-moving angle ΔY and Z-moving angle ΔZ and produces the 2-D orientation angle (α, β) from the integrated value set (ΣΔY, ΣΔZ) and the static angle, the 2-D orientation angle being stored in an orientation angle memory 70.

Between the first and second gyroscopes 302 and 303 and the motion angle calculator 310', there are first and second high-pass filters 305 and 306 for the similar purpose of second and third ones in FIG. 3. It is needless to say that first and second A/D convertos are used at output sides of the high-pass filters for digitally processing of signals, although they are not shown for simplification of the drawings.

The high-pass filter corrector 311 of FIG. 6 can be used in this embodiment, and the digital high-pass filter of FIG. 8 can be used in place of the high-pass filters 305 and 306. The description of the high-pass filters, the A/D convertors, the digital A/d convertors are omitted for the purpose of the simplification of the description.

Receiving time-serial moving angle signals represent time-serial Y-moving angle ΔY(t), t=n, (n–1), (n–2), . . . 1, n--n–1)=St, and time-serial ΔZ(t), the motion angle calculator 310' calculates, Y-moving angle ΔY(n) and Z-moving angle ΔZ(n) at t=n according to the following equations:

$$\begin{bmatrix} \Delta Y(n) \\ \Delta Z(n) \end{bmatrix} = \begin{bmatrix} 1 & 0 \\ 0 & 1/\cos\beta(n-1) \end{bmatrix} \times \begin{bmatrix} Jy(n) \\ Jz(n) \end{bmatrix}$$

The 2-D orientation angle detector according to this embodiment further comprises first and second oscillation removers 321 and 322 for removing a noise included in the first and second gyro outputs (Jy, Jz) due to oscillation of the detector itself due to, for example, unintended vibration of the hand of its user.

The first and second oscillation removers 321 and 322 connect the first and second high-pass filters 305 and 306 with the motion angle calculator 310', respectively. The first and second oscillation removers 321 and 322 process to make first and second time averages of the first and second filter outputs over a predetermined time period, respectively. Then, the first and second oscillation removers 321 and 322 compare the first and second time averages with first and second predetermined threshold values, respectively. The first and second oscillation removers 321 and 322, and temporarily remove parts of the first and second filter outputs when the first and second time averages are smaller than the first and second threshold values, respectively, and produce first and second processed signals. The first and second processed signals are supplied to the motion angle calculator 310' as the first and second incoming signals.

In each of the oscillation removers 321 and 322, the incoming signal is represented by J(n) at t=n, with the threshold value being a, the oscillation remover (321 and 322 defines that the incoming signal has the noise when the following formula is fulfilled:

$$|J(n)+J(n-1)+ \ldots +J(n-a)|/a < \epsilon$$

where a is a number of sampling interval for determining the time period (a·St) for which the average is calculated. The value of a is usually selected 3. Then, the oscillation remover deal the incoming signal J(n) as zero (0), that is , delivers an output signal representing a value of zero (0) in response to the incoming signal J(n).

The static angle calculator 405' is similar to the static angle calculator 405 in FIG. 4 except that it has neither A/D convertor 40502 nor roll angle claculator 40503 for obtaining the tentative roll angle R. Therefore, the description in connection with FIG. 4 should be referred to description of the static angle calculator 405'.

The 2-D orientation angle detector also has a static angle correction definer 50' to deliver a correction signal to the orientation calculator 50', when the tentative pitch angle P and/or the tentative yaw angle Φ are accurate.

The defining operation is similar to that of the correction definer 50 in FIG. 3 but the tentative roll angle R is not defined. The defining operation can be performed according to equations (5) and (6) described above.

Further, the orientation angle calculator 60' only calculate two factors (α, β). Accordingly, correction operation of the orientation angle response to the correction signal from the correction definer is similar to that in the orientation angle calculator 60 in FIG. 3 except that the roll angle γ is not treated. Therefore, description of the orientation angle calculator 60' will be omitted for the purpose of simplification of the description.

INDUSTRIAL APPLICABILITY

According to this invention, an orientation angle detector can be obtained which is small and simple in structure, excellent in accuracy, and low in cost. The orientation angle detector can be used for a detector in HMD, a detector in various test machines for various moving bodies, or an input terminal for a computer, a data processor, and a computer game machine.

What is claimed is:

1. An orientation angle detector comprising:
   a plurality of gyroscopes (301–303) disposed in parallel with a plurality of orthogonal axes (Xs-Zs) defining a detector co-ordinate on said detector, respectively, for measuring angular velocities (Jx, Jy, Jz) around respective axes (Xs-Zs),
   a motion angle calculator (310) coupled to said plurality of gyroscopes (301–303) for calculating a motion angle (ΔX, ΔY, ΔZ) from said angular velocities (Jx, Jy, Jz),
   at least one accelerometer (403, 404) disposed in parallel with at least one of said orthogonal axes (Xs-Zs) for measuring linear acceleration (Ax, Ay),
   a static angle calculator (405) coupled to said at least one accelerometer (403, 404) for calculating a static angle (R, P) from said acceleration (Ax, Ay), and
   an orientation angle calculator (60) coupled to said motion angle calculator (310) and said static angle calculator (405) for integrating said motion angle (ΔX, ΔY, ΔZ) to an integrated angle and calculating an orientation angle (α, β, γ) from said integrated angle, said static angle (R, P) and an azimuthal deviation angle (Φ),
   wherein said orientation angle (α, β, γ) is an angular difference between said detector co-ordinate (Xs-Ys-Zs) and a reference co-ordinate (X-Y-Z) in a space including said detector,
   wherein two magnetometers (401, 402) are disposed in parallel with two of said plurality of orthogonal axes (Xs, Ys) to measure terrestrial magnetic components (Mx, My) in the two of said plurality of axes (Xs, Ys), and
   wherein said static angle calculator (405) is coupled to said two magnetometers (401, 402) for calculating an azimuth from said terrestrial magnetic components (Mx, My) to produce from said azimuth said azimuthal deviation angle (Φ) from said reference co-ordinate (X-Y-Z) as an additional factor of said static angle (R, P).

2. An orientation angle detector as claimed in claim 1, further comprising an orientation angle memory (70) coupled to said orientation angle calculator (60) for storing said orientation angle (α, β, γ), wherein said reference co-ordinate is a three-dimensional co-ordinate having a vertical Z axis and two horizontal Y and X axes, and said detector co-ordinate is another three-dimensional co-ordinates having three orthogonal axes Zs, Ys and Xs corresponding to said Z, Y and X axes, respectively, said orientation angle is represented by Z-Y-X Euler's angle which is composed of three components of yaw angle α being a rotational angle around Z axis, a pitch angle β being a rotational angle around Y axis, and a roll angle γ being a rotational angle around X axis, and wherein said plurality of gyroscopes are first through third gyroscopes (301–303) disposed in parallel with said Xs, Ys and Zs axes for measuring first through third angular velocities (Jx, Jy, Jz) around said Xs, Ys and Zs axes, respectively, said motion angle calculator (310) calculating, from said first through third angular velocities (Jx, Jy, Jz), an X-moving angle ΔX around the X axis, a Y-moving angle ΔY around they axis, and a Z-moving angle ΔZ around Z axis as three factors of said motion angle, and wherein said two terrestrial magnetometers are first and second ones (401, 402) disposed in parallel with Xs and Ys axes for producing first and second magnetic detection signals (Mx, My), respectively, and said at least one accelerometer is first and second accelerometers (403, 404) disposed in parallel with Xs and Ys axes for producing first and second acceleration detection signals (Ax, Ay), said static angle calculator (405) calculating a tentative pitch angle P, a tentative roll angle R and a tentative yaw angle Φ as said azimuthal deviation angle from said first and second magnetic detection signals (Mx, My) and said first and second acceleration detection signals (Ax, Ay), said tentative pitch angle P, said tentative roll angle R and said tentative yaw angle Φ being factors of said static angle, and wherein said orientation angle calculator (60) calculates an integrated value set of first through third integrated values (ΣΔX, ΣΔY, ΣΔZ) by time integration of said X-moving angle ΔX, Y-moving angle ΔY, and Z-moving angle ΔZ and produces said orientation angle from said integrated value set (ΣΔX, ΣΔY, ΣΔZ) and said static angle, said orientation angle being stored in said orientation angle memory (70).

3. An orientation angle detector as claimed in claim 2, wherein said first through third gyroscopes (301–303) are Coriolis vibratory gyroscopes each having a piezoelectric vibrator, said first through third gyroscopes (301–303) produce first through third gyro outputs (Jx, Jy, Jz) representing the angular velocities around said Xs, Ys and Zs axes.

4. An orientation angle detector as claimed in claim 3, which further comprises first through third high-pass filters (304–306) coupled to said first through third Coriolis vibratory gyroscopes (301–303) for canceling offset voltages included in the first through third gyro outputs (Jx, Jy, Jz) of said first through Coriolis vibratory gyroscopes to produce first through third filter outputs, respectively.

5. An orientation angle detector as claimed in claim 4, wherein each of said first through third high-pass filters (304–306) has a cutoff frequency of 0.1 Hz or lower.

6. An orientation angle detector as claimed in claim 4, wherein each of said first through third high-pass filters (304–306) has a variable cutoff frequency.

7. An orientation angle detector as claimed in claim 4, said first through third high-pass filters (304–306) being analogue type high-pass filters, said orientation angle detector further comprising first through third analogue-to-digital convertors (307–309) coupled to said first through third high-pass filters (304–306) for sampling said first through third filter outputs every sampling intervals St to produce first through third time-serial digital signals, respectively, said motion angle calculator (310) receiving said first through third time-serial digital signals as incoming first through third time-serial digital signals to produce three time-serial moving angle signals (ΔX, ΔY, ΔZ) representing said motion angle, said orientation angle calculator (60) receiving said three time-serial moving angle signals (ΔX, ΔY, ΔZ) to time-serially produce said orientation angle, and said orientation angle memory (70) coupled to said orientation angle calculator (60) for storing said orientation angle time-serially delivered from said orientation angle calculator (60).

8. An orientation angle detector as claimed in claim 7, wherein said first through third time-serial moving angle signals represent time-serial X-moving angle ΔX(t), t=n, (n−1), (n−2), ... 1, n−(n−1)=St, time serial Y-moving angle ΔY(t), and time-serial ΔZ (t), said motion angle calculator (310) calculates X-moving angle ΔX(n), Y-moving angle ΔY(n) and Z-moving angle ΔZ(n) at t=n according to the following equations:

$$\begin{bmatrix} \Delta X(n) \\ \Delta Y(n) \\ \Delta Z(t) \end{bmatrix} =$$

$$\begin{bmatrix} 0 & \tan\beta(n-1)\sin\gamma(n-1) & \tan\beta(n-1)\cos\gamma(n-1) \\ 1 & \cos\gamma(n-1) & -\sin\gamma(n-1) \\ 0 & -\sin\gamma(n-1)/\cos\beta(n-1) & \cos\gamma(n-1)/\cos\beta(n-1) \end{bmatrix} \times \begin{bmatrix} Jx(n) \\ Jy(n) \\ Jz(n) \end{bmatrix}$$

where β(n−1) and γ(n−1) are the pitch angle β and roll angle γ at t=n−1 which are read out from said orientation angle memory (70), Jx(n), Jy(n) and Jz(n) being first through third digital signals of said first through third incoming time-serial digital signals at t=n.

9. An orientation angle detector as claimed in claim 8, which further comprise three high-pass filter correction circuits (311) coupled between said first through third analogue-to-digital convertors (307–309) and said motion angle calculator, (310) for compensating errors accompanied at said first through third high-pass filters to produce first through third corrected signals, said first through third corrected signals being delivered to said motion angle calculator (310) as said first through incoming time-serial digital signals, each of said high-pass filter correction circuits (311) performs calculation given by the following equation:

$$J(n)=F(n)+(\Delta t/RC)\cdot\Sigma F(n)$$

where J(n) is said corrected signal which is a corresponding one of said incoming time-serial digital signals at t=n, F(n) is the digital value of the corresponding one of said first through third time-serial digital signals at t=n, and Δt/RC is a constant value.

10. An orientation angle detector as claimed in claim 9, wherein said high-pass filter correction circuit (311) comprises an integrator comprising a first adder (31101) and a registor (31102) for integrating said digital values of said corresponding time serial digital signal to hold an integrated value in said register (31102), a constant value generator (31103) for generating said constant value, a multiplier (31104) coupled to said registor (31102) and said constant value generator (31103) for multiplying said integrated value by said constant value to produce a multiplied value, and a second adder (31105) for adding said multiplied value to said digital values time-serially incoming to produce said corrected signal.

11. An orientation angle detector as claimed in claim 10, wherein said high-pass filter correction circuit (311) further comprises an offset error compensating circuit (31106–3108) for compensating an offset error caused by calculation in said integrator (31101–31102) and said second. adder (31105), said offset error compensating circuit comprising an output definer (31106) for observing when said corrected signal is maintained constant to define the offset error level, an error corrector (31107) coupled to said output definer and responsive to said error level for producing an error correction signal, said error correction signal being supplied to said registor (31102) for correcting said integrated value, and a constant value correction circuit (31108) coupled to said error corrector (31107) and responsive to said error correction signal for correcting saidconstant value of said constant value generator (31103).

12. An orientation angle detector as claimed in claim 4, wherein said first through third high-pass filters are first through third digital high-pass filter devices (FIG. 8) to produce first through third time-serial digital filter outputs, respectivley, each of said first through third digital high-pass filter devices (FIG. 8) comprising an analogue-to-digital convertor (313) coupled to a corresponding one of said first through third gyroscopes (301–303) for sampling a corresponding one of said first through third gyro outputs at sampling intervals St to produce a time-serial digital signal, a digital filter (315) coupled to said analogue-to-digital convertor (313) for filtering said time-serial digital signal to produce a corresponding one of said first through third time-serial digital filter outputs, said motion angle calculator (310) receiving said first through third time-serial digital filter outputs as first through incoming third time-serial digital signals to produce three time-serial moving angle signals (ΔX, ΔY, ΔZ) representing said motion angle, said orientation angle calculator (60) receiving said three time-serial moving angle signals (ΔX, ΔY, ΔZ) to time-serially produce said orientation angle, and said orientation angle memory (70) storing said orientation angle time-serially delivered from said orientation angle calculator.

13. An orientation angle detector as claimed in claim 12, wherein said first through third time-serial moving angle signals represent the time-serial X-moving angle ΔX(t), t=n, (n−1), (n−2), ... , 1, where St=n−(n−1), the time serial Y-moving angle ΔY(t), and the time-serial ΔZ(t), said motion angle calculator (310) calculates the X-moving angle ΔX(n), the Y-moving angle ΔY(n) and the Z-moving angle ΔZ(n) at t=n according to the following equations:

$$\begin{bmatrix} \Delta X(n) \\ \Delta Y(n) \\ \Delta Z(t) \end{bmatrix} = \begin{bmatrix} 0 & \tan\beta(n-1)\sin\gamma(n-1) & \tan\beta(n-1)\cos\gamma(n-1) \\ 1 & \cos\gamma(n-1) & -\sin\gamma(n-1) \\ 0 & -\sin\gamma(n-1)/\cos\beta(n-1) & \cos\gamma(n-1)/\cos\beta(n-1) \end{bmatrix} \times \begin{bmatrix} Jx(n) \\ Jy(n) \\ Jz(n) \end{bmatrix}$$

where β(n−1) and γ(n−1) are the pitch angle β and roll angle γ at t=n−1 which are read out from said orientation angle memory, Jx(n), Jy(n) and Jz(n) being first through third digital signals of said first through third incoming time-serial digital signals at t=n.

14. An orientation angle detector as claimed in claim 13, wherein said digital filter is an infinite impulse response type (315) having delay buffer values (P1, P2), and wherein said digital high-pass filter device (FIG. 8) further comprises a positive/negative definer (316) coupled to an output side of said digital filter (315) for defining from said time-serial digital filter output when said time-serial digital signal changes between positive or negative to produce a change signal, and a delay buffer value reset circuit (317) coupled to said digital filter (315) and said positive/negative definer (316) and responsive to said change signal for resetting said delay buffer values (P1, P2) of said digital filter (315).

15. An orientation angle detector as claimed in claim 14, wherein said digital high-pass filter device (FIG. 8) further comprises an offset value generator (319) for generating an offset value, a multiplier (320) coupled to said offset value generator (319) and connecting said analogue-to-digital convertor (313) with said digital filter (315) for multiplying said time-serial digital signal by said offset value, and an offset value correcting circuit (318) coupled to said offset value generator (319) and said positive/negative definer (316) and responsive to said change signal for correcting said offset value.

16. An orientation angle detector as claimed in claim 3, which further comprises a printed circuit board device (201) having a first and a second side plate sections perpendicular to each other and a third side plate section to form a right-angled triangular cylinder, said first through third piezoelectric ceramic vibrators of said first through third gyroscopes (301, 302, 303) being fixedly mounted on said first, second and third side plate sections, respectively, so that said first through third gyroscopes are disposed in parallel with Xs-axis, Y-axis and Zs-axis of said detection co-ordinate.

17. An orientation angle detector as claimed in claim 16, wherein said printed circuit board device (201) has an end edge of said right-angled triangular cylinder which extends on a single plane, and terminals (204) extending from said end edge for electrical connection with external electric parts.

18. An orientation angle detector as claimed in claim 17, wherein said third side plate section extends in a direction opposite to said end edge beyond said first and second side plate sections.

19. An orientation angle detector as claimed in claim 18, wherein said printed circuit board device (201) comprises a single flexible printed circuit board bent to form into said right-angled triangular cylinder having said first through third side plate portions.

20. An orientation angle detector as claimed in claim 19, wherein said flexible printed circuit board (201) has two slits (202, 203) at bent portions at which said printed circuit board is bent.

21. An orientation angle detector as claimed in claim 16, wherein each of said first through third piezoelectric vibrators is made of any one of piezoelectric ceramics, piezoelectric single crystal material, and silicon.

22. An orientation angle detector as claimed in claim 2, wherein said static angle calculator (405) comprises first and second analogue-to-digital convertors (40501, 40502) coupled to said first and second accelerometers (403, 404) for sampling said first and second acceleration detection signals (Ax, Ay) every sampling intervals St to produce first and second time-serial digital acceleration signals, a tentative pitch angle calculator (40504) coupled to said first analogue convertor (40501) for calculating said tentative pitch angle P from said first time-serial digital acceleration signal, and a tentative roll angle calculator (40503) coupled to said second analogue-to-digital convertor (40502) and said tentative pitch calculator (40504) for calculating said tentative roll angle R from said second time-serial acceleration signal and said tentative pitch angle P, said tentative roll angle R and said tentative pitch angle P being factors of said static angle.

23. An orientation angle detector as claimed in claim 16, wherein said first and second time-serial digital acceleration signals are represented by Ax(t) and Ay(t), where t=n, n−1, . . . , 1, St=n−(n−1), and said tentative pitch angle calculator (40504) and said tentative roll angle calculator (40503) calculate the tentative pitch angle P and the tentative roll angle R according to the following equations, respectively;

$P(n) = \sin^{-1} Ax(n)$, and $R(n) = \sin^{-1}[Ay(n)/\cos P(n)]$, where P(n), R(n), Ax(n) and Ay(n) representing P, R, Ax(t) and Ay(t) at t=n.

24. An orientation angle detector as claimed in claim 23, wherein said static angle calculator (405) comprises third and fourth analogue-to-digital convertors (40505, 40506) coupled to said first and second terrestrial magnetometers (401, 402) for sampling said first and second magnetic detection signals Mx and My every sampling intervals St to produce first and second time-serial digital magnetic detection signals, an co-ordinate transforming calculator (40507) coupled to said third and fourth analogue-to-digital convertors (40505, 40506), said tentative roll angle calculator (40503) and said tentative pitch calculator (40504) for transforming said first and second time-serial digital magnetic detection signals into first and second time-serial digital terrestrial magnetic component signals representing two corresponding terrestrial magnetic components Hx and Hy in the X-Y plane of said reference X-Y-Z co-ordinate, an azimuth calculator (40508) coupled to said co-ordinate transforming calculator (40507) for calculating an azimuth P from said terrestrial magnetic components Hx and Hy to produce a tentative yaw angle Φ as said azimuthal deviation angle, and an azimuth memory (40512) coupled to said azimuth calculator (40508) for storing said azimuth ψ.

25. An orientation angle detector as claimed in claim 24, wherein said static angle calculator (405) further comprises a Z-direction magnetic component generator (40509–40515) coupled to said third and fourth analogue-to-digital convertors (40505, 40506) for producing a time-serial digital Z-direction magnetic component signal Mz from said first and second time-serial magnetic detection signals Mx and My, a terrestrial magnetism Ht previously measured, an initial slant angle θ0 of a Xs-Ys plane defined by Xs and Ys axes of said detector co-ordinate from said X-Y plane, and a current slant angle θ2 of said Xs-Ys plane from said X-Y plane, and said co-ordinate transforming calculator (40507) calculate said terrestrial magnetic components Hx and Hy from said first and second time-serial magnetic detection signals Mx and My, said time-serial digital Z-direction magnetic component signal Mz, and said tentative pitch and roll angles P and R, according to the following equations:

$$Hx(n) = \cos[P(n)] \times Mx(n) + \sin[P(n)] \times Mz(n),$$

and $$Hy(n) = \sin[R(n)] \times \sin[P(n)] \times Mx(n) + \cos[R(n)] \times \cos[P(n)] \times Mz(n),$$

where Hx(n), Hy(n), Mx(n), My(n), Mz(n), P(n) and R(n) represent Hx, Hy, Mx, My, Mz, P and R at t=n, and said azimuth calculator (40508) calculates ψ(n) of said azimuth ψ at t=n from Hx(n) and Hy(n) according to the following equation:

$$\psi(n) = -\tan^{-1}[Hy(n)/Hx(n)],$$

and said azimuth calculator (40508) further calculates Φ(n) of said tentative yaw angle Φ at t=n from said ψ(n) and an initial azimuth deviation angle ψ(0) according to the following equation:

$$\Phi(n) = \Phi(n) - \psi(0).$$

26. An orientation angle detector as claimed in claim 25, wherein said Z-direction magnetic component generator (40509–40515) comprises:

a terrestrial magnetism generator (40509, 40510) for producing said terrestrial magnetism Ht;

a current Z-direction magnetic component absolute value calculator (40511) coupled to said terrestrial magnetism generator (40509, 40510), said third and fourth analogue-to-digital convertors (40505, 40506) for calculating a Z-direction magnetic component absolute value |Mz(n)| from said terrestrial magnetism Ht, said current value Mx(n) and My(n) of said first and second time-serial magnetic detection signals Mx and My at t=n according to the following equation:

$$|Mz(n)| = [Ht^2 - \{Mx(n)^2 + My(n)^2\}]^{1/2};$$

a current slant angle calculator (40513) coupled to said orientation angle memory (70) and said azimuth memory (40512) for calculating said current slant angle θ2;

a sign definer (40514) coupled to said current slant angle calculator (40513) for producing a sign (+ or −) of said current Z-direction magnetic component Mz(n) from said current slant angle θ2 and said initial slant angle θ0; and a current Z-direction magnetic component calculator (40515) coupled to said current Z-direction magnetic component absolute value calculator (40511) and said sign definer (40514) to produce said Z-direction magnetic component Mz(n).

27. An orientation angle detector as claimed in claim 26, wherein said terrestrial magnetism generator (40509, 40510) comprises:

an initial terrestrial magnetism memory (40509) selectively coupled to said third and fourth analogue digital convertors (40505, 40506) through two switching elements (S1, S2), respectively, for memorizing initial X-direction, Y-direction and Z-direction terrestrial magnetic components Mx(0), My(0) and Mz(0) from said third and fourth analogue-to-digital convertors (40505, 40506) through said two switch elements (S1, S2) selectively turned on at initial time; and a processor (40510) coupled to said initial terrestrial magnetism memory (40509) for processing said initial X-direction, Y-direction and Z-direction terrestrial magnetic components Mx(0), My(0) and Mz(0) into said terrestrial magnetism Ht according to the following equation:

$$|Ht| = [Mx(0)^2 + My(0)^2 + Mz(0)^2]^{1/2},$$

the absolute value |Ht| being memorized as said terrestrial magnetism Ht in said initial terrestrial magnetism memory (40509).

28. An orientation angle detector as claimed in claim 27, wherein, at initial state:

said orientation angle detector is, on one hand, positioned so that a particular one of said first and second terrestrial magnetometers (401, 402) is in parallel with said Z axis of said reference co-ordinate, then a corresponding one of said two switch elements (S1, S2) being turned on to memorize the terrestrial magnetic component detected by said particular terrestrial magnetometer (401 or 402) in said initial terrestrial magnetism memory (40509) as said initial Z-direction terrestrial magnetic component Mz(0); and said orientation angle detector is, on the other hand, positioned so that said first and second terrestrial magnetometers (401, 402) are in parallel with said X and Y axes of said reference co-ordinate, then said two switch elements (S1, S2) being turned on to memorize the terrestrial magnetic components detected by said first and second magnetometers (401, 402) in said initial terrestrial magnetism memory (40509) as said initial X-direction terrestrial magnetic component Mx(0) and said initial Y-direction terrestrial magnetic component My(0).

29. An orientation angle detector as claimed in claim 26, wherein said current slant angle calculator (40513) calculates said current slant angle θ2 from an angular value ψ(n−1) of said azimuth ψ at t=n−1 read out from said azimuth memory (40512), and roll and pitch angle values β(n−1) and γ(n−1) of said roll and pitch angles β and γ red out from said orientation angle memory (70), according to the following equation:

$$\theta 2 = \sin^{-1}[aa/(aa^2 + cc^2)^{1/2}],$$

where, aa = cos γ(n−1)×sin β(n−1)×cos ψ(n−1)×sin ψ(n−1) and cc = cos γ(n−1)×cos β(n−1).

30. An orientation angle detector as claimed in claim 29, wherein said sign definer (40514) defines, on one hand, said sign as positive (+) when said current slant angle θ2 is larger than said initial slant angle θ0 but is smaller than 90 angular degree, and defines, on the other hand, said sign as negative (−) when said current slant angle θ2 is equal to or smaller than said initial slant angle θ0 but is larger than −90 angular degree.

31. An orientation angle detector as claimed in claim 22, further comprising a third accelerometer (406) disposed in parallel with Zs-axis of said detector co-ordinate to produce a third acceleration detection signal (Az), wherein said static angle calculator (405) further comprises an additional analogue-to-digital convertor (4061) coupled to said third accelerometer (406) for sampling said third acceleration detection signal (Az) every sampling intervals St to produce a third time-serial digital acceleration signal, said third time-serial acceleration signal being applied to said roll angle calculator (40504) for calculating said tentative roll angle R.

32. An orientation angle detector as claimed in claim 31, wherein said first, second and third time-serial digital acceleration signals are represented by Ax(t), Ay(t) and Az(t), where t=n, n−1, . . . , 1, St=n−(n−1), tentative pitch angle calculator (40504) and said tentative roll angle calculator (40503) calculate the tentative pitch angle P and the tentative roll angle R according to the following equations, respectively;

$$P(n)=\sin^{-1} Ax(n),$$

when $Az>0$, $$R(n)=\sin^{-1}[Ay(n)/\cos P(n)],$$

when $Az<0$ and $Ax>0$ $$R(n)=\pi-\sin^{-1}[Ay(n)/\cos P(n)], \text{ and}$$

when $Az<0$ and $Ax<0$, $$R(n)=-\pi-\sin^{-1}[Ay(n)/\cos P(n)],$$

where P(n), R(n), Ax(n), Ay(n) and Az(n) representing P, R, Ax(t) Ay(t) and Az(t) at t=n.

33. An orientation angle detector as claimed in claim 2, which further comprises a static angle correction definer (50) coupled to said static angle calculator (405) and said orientation angle calculator (60) for defining accuracy of said static angle (P, R, Φ) to produce a correction signal, and wherein said orientation angle calculator (60) is responsive to said correction signal to calculate a correction value and corrects said integrated value set by said correction value to produce a modified value set, said modified value set being delivered as said orientation angle (α, β, γ).

34. An orientation angle detector as claimed in claim 33, wherein said orientation angle calculator (60) calculates first through third integrated values ΣΔX, ΣΔY and ΣΔZ according to the following equations:

$$\Sigma\Delta X(n)=\gamma(n-1)+\Delta X(n),$$

$$\Sigma\Delta Y(n)=\beta(n-1)+\Delta Y(n), \text{ and}$$

$$\Sigma\Delta Z(n)=\alpha(n-1)+\Delta Z(n),$$

where ΔX(n), ΔY(n) and ΔZ(n) are X-moving angle ΔX, Y-moving angle ΔY and Z-moving angle ΔZ, respectively, at a time t=n, and β(n−1), β(n−1) and α(n−1) are said roll angle γ, said pitch angle β and said roll angle α, respectively at a time t=n−1, said γ(n−1), β(n−1) and α(n−1) being read out from orientation angle memory (70).

35. An orientation angle detector as claimed in claim 34, wherein said orientation angle calculator (60) calculates, upon receiving said correction signal, first through third angular errors Ex, Ey and Ez by the following equations:

$$Ex=\Sigma\Delta X(n)-R(n),$$

$$Ey=\Sigma\Delta Y(n)-P(n), \text{ and}$$

$$Ez=\Sigma\Delta Z(n)-\Phi(n),$$

said orientation angle calculator (60) further determines first through third correction values C1, C2, and C3 as said correction value from said first through third angular errors and calculates said first through third modified values as said roll angle γ, said pitch angle β and said yaw angle α by the following equations:

$$\gamma=\Sigma\Delta X(n)-C1,$$

$$\beta=\Sigma\Delta Y(n)-C2, \text{ and}$$

$$\alpha=\Sigma\Delta Z(n)-C3,$$

where C1, C2 and C3 are selected to be values smaller than said first through third angular errors Ex, Ey, and Ez, respectively.

36. An orientation angle detector as claimed in claim 35, wherein said C1, C2, and C3 are determined by k1×Ex, k2×Ey, and k3×Ez, respectively, where k1, k2 and k3 are constant values smaller than 1.

37. An orientation angle detector as claimed in claim 35, which further comprises a correction coefficient generator (80) coupled to said static angle calculator (405) and said orientation angle calculator (60) for generating a set of first through third coefficients m1, m2 and m3, said first through third coefficients m1, m2 and m3 being selected from predetermined different values in response to angular values of said tentative pitch angle P and said tentative roll angle R received from said static angle calculator (405), and wherein said orientation angle calculator is responsive to said set of first through third coefficients m1, m2 and m3 to modify said first through third correction values C1, C2 and C3 by multiplying with said first through third coefficients m1, m2 and m3, respectively.

38. An orientation angle detector as claimed in claim 33, further comprising a third accelerometer (406) disposed in parallel with Zs-axis of said detector co-ordinate to produce a third acceleration detection signal (Az), wherein said static angle correction definer (50) receives said first, second and third acceleration detection signals (Ax, Ay, Az), and calculates an absolute value of a composite acceleration vector of acceleration of Xs-axis direction, Ys-axis direction, and Zs-axis direction, according to the following formula:

$$|A|=(Ax+Ay+Az)^{1/2},$$

said correction definer (50) produces said correction signal when said |A|b 1G, G being the gravity acceleration.

39. An orientation angle detector as claimed in claim 34, wherein said correction definer (50) is provided with a static angle memory (501) for storing said tentative pitch angle P and said tentative roll angle R received from said static angle calculator (405), and wherein said correction definer (50) compares the tentative pitch angle P(n) and tentative roll angle R(n) received at a time t=n with the earlier tentative pitch angle P(n−1) and tentative roll angle R(n−1) at t=n−1 which are read from said static angle memory (501) to define said tentative pitch angle P(n) and tentative roll angle R(n) to be accurate when the following two equations (1) and (2) are fulfilled, respectively:

$$|R(n)-R(n-1)|-B\approx 0 \quad (1), \text{ and}$$

$$|P(n)-P(n-1)|-D\approx 0 \quad (2),$$

where B and D are positive values as selected.

40. An orientation angle detector as claimed in claim 39, wherein said B and D are small values nearly equal to zero(0).

41. An orientation angle detector as claimed in claim 39, wherein said correction definer (50) is connected to said motion angle calculator (310) for receiving said X-moving angle ΔX(n) and said Y-moving angle ΔY(n), and said B and D are selected to be said X-moving angle ΔX(n) and said Y-moving angle ΔY(n), respectively.

42. An orientation angle detector as claimed in claim 39, wherein said correction definer (50) is further received said tentative yaw angle Φ(t) and said Z-moving angle ΔZ(t) from said static angle calculator (405) and motion angle calculator (310), respectively, said tentative yaw angle Φ(t) being stored in said static angle memory (501), said correction angle definer (50) further processes the tentative yaw angle Φ(n) and the Z-moving angle ΔZ(n) at t=n and the yaw angle Φ(n−1) at t=n−1 which is read from said orientation angle memory (501), according to the following equation (3):

$$|\Phi(n)\Phi(n-1)|-\Delta Z(n)\approx 0 \quad (3),$$

and defines said the tentative yaw angle Φ(n) to be accurate when the equation (3).

43. An orientation angle detector as claimed in claim 34, wherein said correction definer (50) is provided with a static and motion angle memory (501) for storing said tentative pitch angle P(n) and said tentative roll angle R(n) received from said static angle calculator (405), and said X-moving angle ΔX and said Y-moving angle ΔY received from said motion angle calculator (310), and wherein said correction definer (50) calculates a moving average of variation of said tentative pitch angle P(t), a moving average of variation of said tentative roll angle R(t), a moving average of said X-moving angle ΔX(t), and a moving average of said Y-moving angle ΔY(t), and defines said tentative pitch angle P(n) and said tentative roll angle R(n) to be accurate when the following two equations (1) and (2) are fulfilled, respectively:

$$[R(n)-R(n-1)]/C-[\Delta X(n)+\Delta X(n-1)+\ldots+\Delta X(n-C+1)]/C\approx 0 \quad (1)$$

$$[P(n)-P(n-1)]/C-[\Delta Y(n)+\Delta Y(n-1)+\ldots+\Delta Y(n-C+1)]/C\approx 0 \quad (2).$$

44. An orientation angle detector as claimed in claim 43, where said correction definer (50) stores in said static and motion angle memory (501) said tentative yaw angle Φ(n) from said static angle calculator (405) and said Z-moving angle ΔZ from said motion angle calculator (310), wherein said correction definer (50) further calculates a moving average of variation of said tentative yaw angle Φ(t), a moving average of said Z-moving angle ΔZ(t), and define said tentative yaw angle Φ(n) to be accurate when the following equation (3) is fulfilled:

$$[\Phi(n)-\Phi(n-1)]/C-[\Delta Z(n)+\Delta Z(n-1)+\ldots+\Delta Z(n-C+1)]/C\approx 0 \quad (1).$$

45. An orientation angle detector as claimed in claim 39 or 43, wherein said correction definer (50) produces said correction signal when at least one of said tentative pitch angle P(n) and said tentative roll angle R(n) is defined accurate, and said correction definer (50) produces a non-correction signal when none of said tentative pitch angle and said tentative roll angle R(n) is defined accurate, said orientation angle calculator (60) is responsive to said non-correction signal to produces said integrated value set ΣΔX (n), ΣΔY (n) and ΣΔZ(n)) as said orientation angle (γ, β, α).

46. An orientation angle detector as claimed in claim 42 or 44, wherein said correction definer (50) produces said correction signal when said tentative yaw angle Φ(n) is defined accurate but in no relation to whether or not said tentative pitch angle and said tentative roll angle R(n) are defined accurate, and said correction definer (50) produces a non-correction signal when none of said tentative pitch angle, said tentative roll angle R(n) and said yaw angle Φ(n) is defined accurate, said orientation angle calculator (60) is responsive to said non-correction signal to produces said integrated value set ΣΔX(n), ΣΔY(n) and ΣΔZ(n)) as said orientation angle (γ, β, α).

47. An orientation angle detector as claimed in any one of claims 39, 42, 43, and 44, wherein said correction definer (50), upon defining accuracy of particular ones of said tentative roll angle R, said tentative pitch angle P and said tentative yaw angle Φ produces, as said correction signal, an indication signal representative of that particular ones of said tentative roll angle R, said tentative pitch angle P and said tentative yaw angle Φ which are defined accurate, and wherein said orientation angle calculator (60) is responsive to said indication signal to modify specific ones of said first through third integrated values ΣΔX(n), ΣΔY(n) and ΣΔZ(n) corresponding to said particular ones of said tentative roll angle R, said tentative pitch angle P and said tentative yaw angle Φ by use of said tentative pitch angle P, said tentative roll angle R and said tentative yaw angle Φ to produce specific modified values, said orientation angle calculator (60) delivers said specific modified values as that specified ones of said roll angle γ, said pitch angle β and said yaw angle α, respectively, which are corresponding to said specific ones of said first through third integrated values ΣΔX(n), ΣΔ(n) and ΣΔZ(n), and said orientation angle calculator (60) delivers the remaining ones other than said specific ones of said first through third integrated values ΣΔX(n), ΣΔY(n) and ΣΔZ(n) as the remaining ones other than said specified ones of said roll angle β, said pitch angle β and said yaw angle α.

48. An orientation angle detector as claimed in claim 1, wherein said reference co-ordinate is a three-dimensional co-ordinate having a vertical Z axis and two horizontal Y and X axes, and said detector co-ordinate is another three-dimensional co-ordinates having three orthogonal axes Zs, Ys and Xs corresponding to said Z, Y and X axes, respectively, said orientation angle is represented by Z-Y-X Euler's angle which is composed of three components of a yaw angle α being a rotational angle around Z axis, a pitch angle β being a rotational angle around Y axis, and a roll angle γ being a rotational angle around X axis, said orientation angle delivering only said yaw angle α and said pitch angle β as a 2-D orientation angle, wherein said plurality of gyroscopes are first and second gyroscopes (302, 303) disposed in parallel with said Ys and Zs axes for measuring first and second angular velocities (Jy, Jz) around said Ys and Zs axes, respectively, said motion angle calculator (310') calculating, from said first and second angular velocities (Jy, Jz), a Y-moving angle ΔY around the Y axis, and a Z-moving angle ΔZ around Z axis as two factors of said motion angle, and wherein said two terrestrial magnetometers are first and second ones (401, 402) disposed in parallel with Xs and Ys axes for producing first and second magnetic detection signals (Mx, My), respectively, and said at least one accelerometer is one accelerometer (403) disposed in parallel with Xs axis for producing an acceleration detection signal (Ax), said static angle calculator (405') calculating a tentative pitch angle P and a tentative yaw angle Φ as said azimuthal deviation angle from said first and second magnetic detection signals (Mx, My) and said acceleration detection signal (Ax), said tentative pitch angle P and said tentative yaw angle Φ being factors of said static angle, and wherein said orientation angle calculator (60') calculates an integrated value set of first and second integrated values (ΣΔY, ΣΔZ) by time integration of said Y-moving angle ΔY and Z-moving angle ΔZ and produces said 2-D orientation angle (α, β) from said integrated value set (ΣΔY, ΣΔZ) and said static angle, said 2-D orientation angle being stored in an orientation angle memory (70).

49. An orientation angle detector as claimed in claim 48, wherein said first and second gyroscopes (302, 303) are Coriolis vibratory gyroscopes each having a piezoelectric vibrator, said first and second gyroscopes (302, 303) produce first and second gyro outputs (Jy, Jz) representing the angular velocities around said Ys and Zs axes.

50. An orientation angle detector as claimed in claim 49, which further comprises first and second high-pass filters (305, 306) coupled to said first and second Coriolis vibratory gyroscopes (302, 303) for canceling offset voltages included in the first and second gyro outputs (Jy, Jz) of said first and second Coriolis vibratory gyroscopes to produce first and second filter outputs, respectively.

51. An orientation angle detector as claimed in claim 50, wherein said motion angle calculator (310') receiving said firsthand second filter outputs as first and second incoming signals to produce first and second time-serial moving angle signals ($\Delta Y$, $\Delta Z$) representing said motion angle, said orientation angle calculator (60') receiving said first and second time-serial moving angle signals ($\Delta Y$, $\Delta Z$) to time-serially produce said orientation angle, and said orientation angle memory (70) coupled to said orientation angle calculator (60') for storing said orientation angle time-serially delivered from said orientation angle calculator (60').

52. An orientation angle detector as claimed in claim 51, wherein said first and second time-serial moving angle signals represent time-serial Y-moving angle $\Delta Y(t)$, t=n, (n−1), (n−2), . . , 1, n−(n−1)=St, and time-serial $\Delta Z(t)$, said motion angle calculator (310') calculates, Y-moving angle $\Delta Y(n)$ and Z-moving angle $\Delta Z(n)$ at t=n according to the following equations:

$$\begin{bmatrix} \Delta Y(n) \\ \Delta Z(n) \end{bmatrix} = \begin{bmatrix} 1 & 0 \\ 0 & 1/\cos\beta(n-1) \end{bmatrix} \times \begin{bmatrix} Jy(n) \\ Jz(n) \end{bmatrix}$$

where (n−1) is the pitch angle $\beta$ at t=n−1 which are read out from said orientation angle memory (70), Jy(n) and Jz(n) being said first and second incoming signals at t=n.

53. An orientation angle detector as claimed in claim 51, further comprising first and second oscillation removers (321, 322) connecting said first and second high-pass filters (305, 306) with said motion angle calculator (310'), respectively, for removing a noise included in said first and second gyro outputs (Jy, Jz) due to oscillation of said detector itself.

54. An orientation angle detector as claimed in claim 53, wherein said first and second oscillation removers (321, 322) process to make first and second time averages of said first and second filter outputs over a predetermined time period, respectively, and to compare said first and second time averages with first and second predetermined threshold values, respectively, said first and second oscillation removers (321, 322) temporarily removing parts of said first and second filter outputs when said first and second time averages are smaller than said first and second threshold values, respectively, to produce first and second processed signals, said first and second processed signals being supplied to said motion angle calculator (310') as said first and second incoming signals.

55. An orientation angle detector as claimed in claim 48, wherein said static angle calculator (405') comprises a first analogue-to-digital convertor (40501) coupled to said accelerometer (403) for sampling said acceleration detection signals (Ax) every sampling intervals St to produce a time-serial digital acceleration signal, a tentative pitch angle calculator (40504) coupled to said first analogue convertor (40501) for calculating said tentative pitch angle P from said time-serial digital acceleration signal.

56. An orientation angle detector as claimed in claim 55, wherein said time-serial digital acceleration signal is represented by Ax(t), where t=n, n−1, . . . , 1, St=n−(n−1), said tentative pitch angle calculator (40504) calculates the tentative pitch angle P according to the following equation:

$$P(n)=\sin^{-1}Ax(n), \text{ and}$$

where P(n), and Ax(n) representing P, and Ax(t) at t=n.

57. An orientation angle detector as claimed in claim 55, wherein said static angle calculator (405') comprises second and third analogue-to-digital convertors (40505, 40506) coupled to said first and second terrestrial magnetometers (401, 402) for sampling said first and second magnetic detection signals Mx and My every sampling intervals St to produce first and second time-serial digital magnetic detection signals, an azimuth calculator (40508) coupled to said second and third analogue-to-digital convertors (40505, 40506) for calculating from said first and second time-serial digital magnetic detection signals an azimuth $\psi$ to produce a tentative yaw angle as said azimuthal deviation angle.

58. An orientation angle detector as claimed in claim 57, which further comprises a static angle correction definer (50') coupled to said static angle calculator (405') and said orientation angle calculator (60') for defining accuracy of said static angle (P, $\Phi$) to produce a correction signal, and wherein said orientation angle calculator (60') is responsive to said correction signal to calculate a correction value and corrects said integrated value set by said correction value to produce a modified value set, said modified value set being delivered as said 2-D orientation angle ($\alpha$, $\beta$).

59. An orientation angle detector as claimed in claim 58, wherein said orientation angle calculator (60') calculates first and second integrated values $\Sigma\Delta Y$ and $\Sigma\Delta Z$ according to the following equations:

$$\Sigma\Delta Y(n)=\beta(n-1)+\Delta Y(n), \text{ and}$$

$$\Sigma\Delta Z(n)=\alpha(n-1)+\Delta Z(n),$$

where $\Delta Y(n)$ and $\Delta Z(n)$ are Y-moving angle $\Delta Y$ and Z-moving angle $\Delta Z$, respectively, at a time t=n, and $\beta(n-1)$ and $\alpha(n-1)$ are said pitch angle $\beta$ and said roll angle $\alpha$, respectively at a time t=n−1, said $\beta(n-1)$ and $\alpha(n-1)$ being read out from orientation angle memory (70).

60. An orientation angle detector as claimed in claim 59, wherein said orientation angle calculator (60') calculates, upon receiving said correction signal, first and second angular errors Ey and Ez by the following equations:

$$Ey=\Sigma\Delta Y(n)-P(n), \text{ and}$$

$$Ez=\Sigma\Delta Z(n)-\Phi(n),$$

said orientation angle calculator (60') further determines first and second correction values C1 and C2 as said correction values from said first and second angular errors and calculates said first and second modified values as said pitch angle $\beta$ and said yaw angle $\alpha$ by the following equations:

$$\beta=\Sigma\Delta Y(n)-C1, \text{ and}$$

$$\alpha=\Sigma\Delta Z(n)-C2,$$

where C1 and C2 are selected to be values smaller than said first and second angular errors Ey, and Ez, respectively.

61. An orientation angle detector as claimed in claim 60, wherein said C1 and C2 are determined by k1×Ey and k2×Ez, respectively, where k1 and k2 are constant values smaller than 1.

62. An orientation angle detector as claimed in claim 59, wherein said correction definer (50') is coupled to said motion angle calculator (310'), said correction definer (50') calculates a moving average of variation of said tentative pitch angle P(t), a moving average of said Y-moving angle ΔY(t), a moving average of variation of said tentative yaw angle Φ(t), and a moving average of said Z-moving angle ΔZ(t) and defines said tentative pitch angle P(n) and said tentative yaw angle Φ(n) to be accurate when the following two equations (1) and (2) is fulfilled:

$$[P(n)-P(n-1)]/C-[\Delta Y(n)+\Delta Y(n-1)+ \ldots +\Delta Y(n-C+1)]/C \approx 0 \quad (1)$$

and, $$[\Phi(n)-\Phi(n-1)]/C-[\Delta Z(n)+\Delta Z(n-1)+ \ldots +\Delta Z(n-C+1)]/C \approx 0 \quad (2).$$

63. An orientation angle detector as claimed in claim 62, wherein said correction definer (50') produces said correction signal when at least one of said tentative pitch angle and said tentative yaw angle Φ(n) is defined accurate, and said correction definer (50') produces a non-correction signal when none of said tentative pitch angle P(n) and said tentative yaw angles Φ(n) is defined accurate, said orientation angle calculator (60') is responsive to said non-correction signal to produces said integrated value set (ΣΔY(n) and ΣΔZ(n)) as said 2-D orientation angle (β, α).

64. An orientation angle detector as claimed in claim 62, wherein said correction definer (50'), upon defining accuracy of a particular one of said tentative pitch angle P and said tentative yaw angle Φ, produces, as said correction signal, an indication signal representative of that particular one of said tentative pitch angle P and said tentative yaw angle Φ which is defined accurate, and wherein said orientation angle calculator (60') is responsive to said indication signal to modify a specific one of said first and second integrated values ΣΔY(n) and ΣΔZ(n) corresponding to said particular one of said tentative pitch angle P and said tentative yaw angle Φ by use of said tentative pitch angle P and said tentative yaw angle Φ to produce a specific modified value, said orientation angle calculator (60') delivers said specific modified value as that specified one of said pitch angle β and said yaw angle α, respectively, which is corresponding to said specific one of said first and second integrated values ΣΔY(n) and ΣΔZ(n), and said orientation angle calculator (60') delivers the remaining one other than said specific one of said first and second integrated values ΣΔY(n) and ΣΔZ(n) as the remaining one other than said specified one of said pitch angle β and said yaw angle α.

* * * * *